US012776247B2

(12) United States Patent
Kim et al.

(10) Patent No.: US 12,776,247 B2

(45) Date of Patent: Oct. 27, 2026

(54) GATE DRIVER, DISPLAY APPARATUS INCLUDING THE SAME AND ELECTRONIC APPARATUS INCLUDING THE SAME

(71) Applicants: Samsung Display Co., Ltd., Yongin-si (KR); IUCF-HYU (Industry-University Cooperation Foundation Hanyang University), Seoul (KR)

(72) Inventors: Sanghun Kim, Yongin-si (KR); Oh Kyong Kwon, Seoul (KR); Nackhyeon Keum, Yongin-si (KR); Kyung-Hoon Kim, Yongin-si (KR); Sung Min Wee, Seoul (KR); Jun Hyeok Jang, Seoul (KR); Heerim Song, Yongin-si (KR)

(73) Assignees: Samsung Display Co., Ltd., Yongin-si (KR); IUCF-HYU (Industry-University Cooperation Foundation Hanyang University), Seoul (KR)

(*) Notice: Subject to any disclaimer, the term of this patent is extended or adjusted under 35 U.S.C. 154(b) by 0 days.

(21) Appl. No.: 19/364,760

(22) Filed: Oct. 21, 2025

(65) Prior Publication Data

US 2026/0134813 A1 May 14, 2026

(30) Foreign Application Priority Data

Nov. 13, 2024 (KR) ........................ 10-2024-0160722

(51) Int. Cl.
*G09G 3/20* (2006.01)

(52) U.S. Cl.
CPC ... *G09G 3/2092* (2013.01); *G09G 2310/0267* (2013.01); *G09G 2310/08* (2013.01); *G09G 2330/021* (2013.01)

(58) Field of Classification Search
CPC ......... G09G 2310/0267; G09G 3/2092; G09G 2310/08; G09G 2330/021
See application file for complete search history.

(56) References Cited

U.S. PATENT DOCUMENTS

| | | | | |
|---|---|---|---|---|
| 11,580,905 | B2 | 2/2023 | Kitsomboonloha et al. | |
| 2021/0366408 | A1* | 11/2021 | In ........................ | G09G 3/3291 |

(Continued)

FOREIGN PATENT DOCUMENTS

| | | |
|---|---|---|
| KR | 10-2185361 | 12/2020 |
| KR | 10-2021-0152085 | 12/2021 |
| KR | 10-2023-0099185 | 7/2023 |

*Primary Examiner* — Muhammad N Edun

(74) *Attorney, Agent, or Firm* — Womble Bond Dickinson (US) LLP

(57) ABSTRACT

A gate driver includes an input circuit transmitting an input signal to a Q-node in response to a first clock signal, a first A-node control circuit controlling an A-node in response to the first clock signal or the Q-node, a second A-node control circuit controlling the A-node in response to a second clock signal, a B-node control circuit controlling a B-node in response to the first clock signal and the Q-node, a C-node control circuit controlling a C-node in response to the B-node, a first QB-node control circuit controlling a QB-node in response to the second clock signal, a second QB-node control circuit controlling the QB-node in response to the Q-node, a pull-up circuit pulling up a gate output signal to a high power voltage in response to the QB-node and a pull-down circuit pulling down the gate output signal to a low power voltage in response to the Q-node.

20 Claims, 24 Drawing Sheets

(56) References Cited

U.S. PATENT DOCUMENTS

| | | | | |
|---|---|---|---|---|
| 2022/0301496 | A1* | 9/2022 | Park | G11C 19/28 |
| 2024/0212549 | A1* | 6/2024 | Lim | G09G 3/20 |

* cited by examiner

GATE DRIVER, DISPLAY APPARATUS INCLUDING THE SAME AND ELECTRONIC APPARATUS INCLUDING THE SAME

CROSS-REFERENCE TO RELATED APPLICATION

The present application claims priority to and the benefit of Korean Patent Application No. 10-2024-0160722, filed on Nov. 13, 2024, in the Korean Intellectual Property Office, the entire disclosure of which is incorporated herein by reference.

BACKGROUND

1. Field

Aspects of some embodiments of the present disclosure relate to a gate driver, a display apparatus including the gate driver and an electronic apparatus including the display apparatus.

2. Description of the Related Art

Generally, a display apparatus includes a display panel and a display panel driver. The display panel includes a plurality of gate lines, a plurality of data lines, a plurality of emission lines and a plurality of pixels. The display panel driver includes a gate driver, a data driver, an emission driver and a driving controller. The gate driver outputs gate signals to the gate lines. The data driver outputs data voltages to the data lines. The emission driver outputs emission signals to the emission lines. The driving controller controls the gate driver, the data driver, and the emission driver.

Control nodes of the gate driver may have a high level, a low level and a second low level less than the low level. When the control node has the low level, a turned-on state and a turned-off state of a transistor connected to the control node are uncertain so that an output of the gate signal may become unstable and accordingly, an accuracy and a reliability of the gate driver may become deteriorated and a display quality of the display panel may be deteriorated.

In addition, when a voltage of the control node increases due to a current leakage, a pull-down circuit of the gate driver may not operate normally so that an output of the gate signal may become unstable and accordingly, an accuracy and a reliability of the gate driver may become deteriorated and a display quality of the display panel may be deteriorated.

When a current leakage occurs at the control node, it may be difficult to drive the display apparatus at a low refresh rate. When a low refresh rate driving of the display apparatus is disabled, a power consumption of the display apparatus may be increased.

The above information disclosed in this Background section is only for enhancement of understanding of the background and therefore the information discussed in this Background section does not necessarily constitute prior art.

SUMMARY

Aspects of some embodiments of the present disclosure relate to a gate driver, a display apparatus including the gate driver and an electronic apparatus including the display apparatus. For example, aspects of some embodiments of the present disclosure relate to a gate driver that may be capable of relatively enhancing an accuracy and a reliability of the gate driver, relatively enhancing a display quality of a display panel and relatively reducing a power consumption of a display apparatus, the display apparatus including the gate driver and an electronic apparatus including the display apparatus.

Aspects of some embodiments of the present disclosure include a gate driver bootstrapping a Q-node using a first path and a second path to enhance a reliability of the gate driver and a display quality of bootstrapping a Q-node using a first path and a second path to enhance a reliability of the gate driver and a display quality of a display panel, and periodically refreshing a signal of the Q-node in synchronization with a clock signal to prevent a current leakage of the Q-node and to support a low refresh rate driving.

Aspects of some embodiments of the present disclosure include a display apparatus including the gate driver.

Aspects of some embodiments of the present disclosure include an electronic apparatus including the display apparatus.

According to some embodiments of the present disclosure, a gate driver includes an input circuit, a first A-node control circuit, a second A-node control circuit, a B-node control circuit, a C-node control circuit, a first QB-node control circuit, a second QB-node control circuit, a pull-up circuit and a pull-down circuit. According to some embodiments, the input circuit is configured to transmit an input signal to a Q-node in response to a first clock signal. According to some embodiments, the first A-node control circuit is configured to control a signal of an A-node in response to the first clock signal or a signal of the Q-node. According to some embodiments, the second A-node control circuit is configured to control the signal of the A-node in response to a second clock signal. According to some embodiments, the B-node control circuit is configured to control a signal of a B-node in response to the first clock signal and the signal of the Q-node. According to some embodiments, the C-node control circuit is configured to control a signal of a C-node in response to the signal of the B-node. According to some embodiments, the first QB-node control circuit is configured to control a signal of a QB-node in response to the second clock signal. According to some embodiments, the second QB-node control circuit is configured to control the signal of the QB-node in response to the signal of the Q-node. According to some embodiments, the pull-up circuit is configured to pull up a gate output signal to a high power voltage in response to the signal of the QB-node. According to some embodiments, the pull-down circuit is configured to pull down the gate output signal to a low power voltage in response to the signal of the Q-node.

According to some embodiments, when the input signal has a low level and the first clock signal has a low level, the signal of the Q-node may be decreased to a second low level through a first path passing through the input circuit and a second path passing through the first A-node control circuit.

According to some embodiments, the gate driver may further include a first capacitor including a first electrode configured to receive the high power voltage and a second electrode connected to the QB-node.

According to some embodiments, the gate driver may further include a second capacitor including a first electrode connected to the B-node and a second electrode connected to the C-node.

According to some embodiments, the gate driver may further include a third capacitor including a first electrode connected to the Q-node and a second electrode connected to the A-node.

According to some embodiments, the input circuit may include a first transistor including a control electrode configured to receive the first clock signal, a first electrode receiving the input signal and a second electrode connected to a first intermediate node and a twelfth transistor including a control electrode configured to receive the low power voltage, a first electrode connected to the first intermediate node and a second electrode connected to the Q-node.

According to some embodiments, the first A-node control circuit may include a second transistor including a control electrode configured to receive the first clock signal, a first electrode connected to the A-node and a second electrode connected to a second intermediate node and a third transistor including a control electrode connected to the Q-node, a first electrode configured to receive the first clock signal and a second electrode connected to the second intermediate node.

According to some embodiments, the first A-node control circuit may include a second transistor including a control electrode configured to receive the first clock signal, a first electrode connected to the A-node and a second electrode connected to the B-node.

According to some embodiments, the second A-node control circuit may include an eighth transistor including a control electrode configured to receive the second clock signal, a first electrode configured to receive the high power voltage and a second electrode connected to the A-node.

According to some embodiments, the B-node control circuit may include a fourth transistor including a control electrode connected to the Q-node, a first electrode configured to receive the first clock signal and a second electrode connected to a third intermediate node, a thirteenth transistor including a control electrode configured to receive the low power voltage, a first electrode connected to the third intermediate node and a second electrode connected to the B-node and a fifth transistor including a control electrode configured to receive the first clock signal, a first electrode configured to receive the low power voltage and a second electrode connected to the B-node.

According to some embodiments, the C-node control circuit may include a seventh transistor including a control electrode connected to the B-node, a first electrode configured to receive the second clock signal and a second electrode connected to the C-node.

According to some embodiments, the first QB-node control circuit may include a sixth transistor including a control electrode configured to receive the second clock signal, a first electrode connected to the QB-node and a second electrode connected to the C-node.

According to some embodiments, the second QB-node control circuit may include a ninth transistor including a control electrode connected to the Q-node, a first electrode configured to receive the high power voltage and a second electrode connected to the QB-node.

According to some embodiments, the input signal may have a low level in a first driving period. According to some embodiments, the first clock signal may have a high level in the first driving period. According to some embodiments, the second clock signal may have a low level in the first driving period. According to some embodiments, the signal of the Q-node may have a low level in the first driving period. According to some embodiments, the signal of the QB-node may have a high level in the first driving period. According to some embodiments, the gate output signal may have a low level in the first driving period.

According to some embodiments, the input signal may have a high level in a second driving period subsequent to the first driving period. According to some embodiments, the first clock signal may have a low level in the second driving period. According to some embodiments, the second clock signal may have a high level in the second driving period. According to some embodiments, the signal of the Q-node may have a high level in the second driving period. According to some embodiments, the signal of the QB-node may have the high level in the second driving period. According to some embodiments, the gate output signal may have the low level in the second driving period.

According to some embodiments, the input signal may have the high level in a third driving period subsequent to the second driving period. According to some embodiments, the first clock signal may have the high level in the third driving period. According to some embodiments, the second clock signal may have the low level in the third driving period. According to some embodiments, the signal of the Q-node may have the high level in the third driving period. According to some embodiments, the signal of the QB-node may have a low level in the third driving period. According to some embodiments, the gate output signal may have a high level in the third driving period.

According to some embodiments, the input signal may have the high level in a fourth driving period subsequent to the third driving period. According to some embodiments, the first clock signal may have the low level in the fourth driving period. According to some embodiments, the second clock signal may have the high level in the fourth driving period. According to some embodiments, the signal of the Q-node may have the high level in the fourth driving period. According to some embodiments, the signal of the QB-node may have the low level in the fourth driving period. According to some embodiments, the gate output signal may have the high level in the fourth driving period.

According to some embodiments, the input signal may have the low level in a fifth driving period subsequent to the fourth driving period. According to some embodiments, the first clock signal may have the high level in the fifth driving period. According to some embodiments, the second clock signal may have the low level in the fifth driving period. According to some embodiments, the signal of the Q-node may have the high level in the fifth driving period. According to some embodiments, the signal of the QB-node may have the low level in the fifth driving period. According to some embodiments, the gate output signal may have the high level in the fifth driving period.

According to some embodiments, the input signal may have the low level in a sixth driving period subsequent to the fifth driving period. According to some embodiments, the first clock signal may have the low level in the sixth driving period. According to some embodiments, the second clock signal may have the high level in the sixth driving period. According to some embodiments, the signal of the Q-node may have a second low level in the sixth driving period. According to some embodiments, the signal of the QB-node may have the high level in the sixth driving period. According to some embodiments, the gate output signal may have the low level in the sixth driving period.

According to some embodiments of the present disclosure, a display apparatus includes a display panel, a gate driver and a data driver. According to some embodiments, the display panel includes a pixel. According to some embodiments, the gate driver is configured to output a gate signal to the pixel. According to some embodiments, the data driver is configured to output a data voltage to the pixel. According to some embodiments, the gate driver includes an input circuit, a first A-node control circuit, a second A-node control circuit, a B-node control circuit, a C-node control circuit, a first QB-node control circuit, a second QB-node control circuit, a pull-up circuit and a pull-down circuit. According to some embodiments, the input circuit is configured to transmit an input signal to a Q-node in response to a first clock signal. According to some embodiments, the first A-node control circuit is configured to control a signal of an A-node in response to the first clock signal or a signal of the Q-node. According to some embodiments, the second A-node control circuit is configured to control the signal of the A-node in response to a second clock signal. According to some embodiments, the B-node control circuit is configured to control a signal of a B-node in response to the first clock signal and the signal of the Q-node. According to some embodiments, the C-node control circuit is configured to control a signal of a C-node in response to the signal of the B-node. According to some embodiments, the first QB-node control circuit is configured to control a signal of a QB-node in response to the second clock signal. According to some embodiments, the second QB-node control circuit is configured to control the signal of the QB-node in response to the signal of the Q-node. According to some embodiments, the pull-up circuit is configured to pull up the gate signal to a high power voltage in response to the signal of the QB-node. According to some embodiments, the pull-down circuit is configured to pull down the gate signal to a low power voltage in response to the signal of the Q-node.

According to some embodiments of the present disclosure, an electronic apparatus includes a display panel, a gate driver, a data driver, a driving controller and a processor. According to some embodiments, the display panel includes a pixel. According to some embodiments, the gate driver is configured to output a gate signal to the pixel. According to some embodiments, the data driver is configured to output a data voltage to the pixel. According to some embodiments, the driving controller is configured to control the gate driver and the data driver. According to some embodiments, the processor is configured to output input image data and an input control signal to the driving controller. According to some embodiments, the gate driver includes an input circuit, a first A-node control circuit, a second A-node control circuit, a B-node control circuit, a C-node control circuit, a first QB-node control circuit, a second QB-node control circuit, a pull-up circuit and a pull-down circuit. According to some embodiments, the input circuit is configured to transmit an input signal to a Q-node in response to a first clock signal. According to some embodiments, the first A-node control circuit is configured to control a signal of an A-node in response to the first clock signal or a signal of the Q-node. According to some embodiments, the second A-node control circuit is configured to control the signal of the A-node in response to a second clock signal. According to some embodiments, the B-node control circuit is configured to control a signal of a B-node in response to the first clock signal and the signal of the Q-node. According to some embodiments, the C-node control circuit is configured to control a signal of a C-node in response to the signal of the B-node. According to some embodiments, the first QB-node control circuit is configured to control a signal of a QB-node in response to the second clock signal. According to some embodiments, the second QB-node control circuit is configured to control the signal of the QB-node in response to the signal of the Q-node. According to some embodiments, the pull-up circuit is configured to pull up the gate signal to a high power voltage in response to the signal of the QB-node. According to some embodiments, the pull-down circuit is configured to pull down the gate signal to a low power voltage in response to the signal of the Q-node.

According to the gate driver, and the display apparatus including the gate driver and the electronic apparatus including the display apparatus, when the input signal has a low level and the first clock signal has a low level, the signal of the Q-node may be lowered to the second low level at once through the first path passing through the input circuit and the second path passing through the first A-node control circuit without decreased to an intermediate voltage. Thus, a reliability of the gate driver may be relatively enhanced and the display quality of the display panel may be relatively enhanced.

In addition, the signal of the Q-node may be periodically refreshed to the second low level using the second transistor periodically operating in synchronization with the first clock signal so that the current leakage of the Q-node may be prevented or reduced, and thus the reliability of the gate driver may be relatively enhanced and the display quality of the display panel may be relatively enhanced.

In addition, the current leakage of the Q-node may be prevented or reduced by refreshing the signal of the Q-node to the second low level so that the gate driver may support the low refresh rate driving. Thus, the power consumption of the display apparatus may be relatively reduced by the low refresh rate driving.

In addition, the gate driver may be driven using only two power voltages including a high power voltage and a low power voltage so that a complexity of a power voltage generator may be relatively reduced and a complexity of a layout due to additional power lines may be relatively reduced.

BRIEF DESCRIPTION OF THE DRAWINGS

The above and other aspects and characteristics of embodiments according to the present disclosure will become more apparent by describing in more detail aspects of some embodiments thereof with reference to the accompanying drawings, in which.

DETAILED DESCRIPTION

Hereinafter, aspects of some embodiments of the present disclosure will be explained in more detail with reference to the accompanying drawings.

Figure 1:
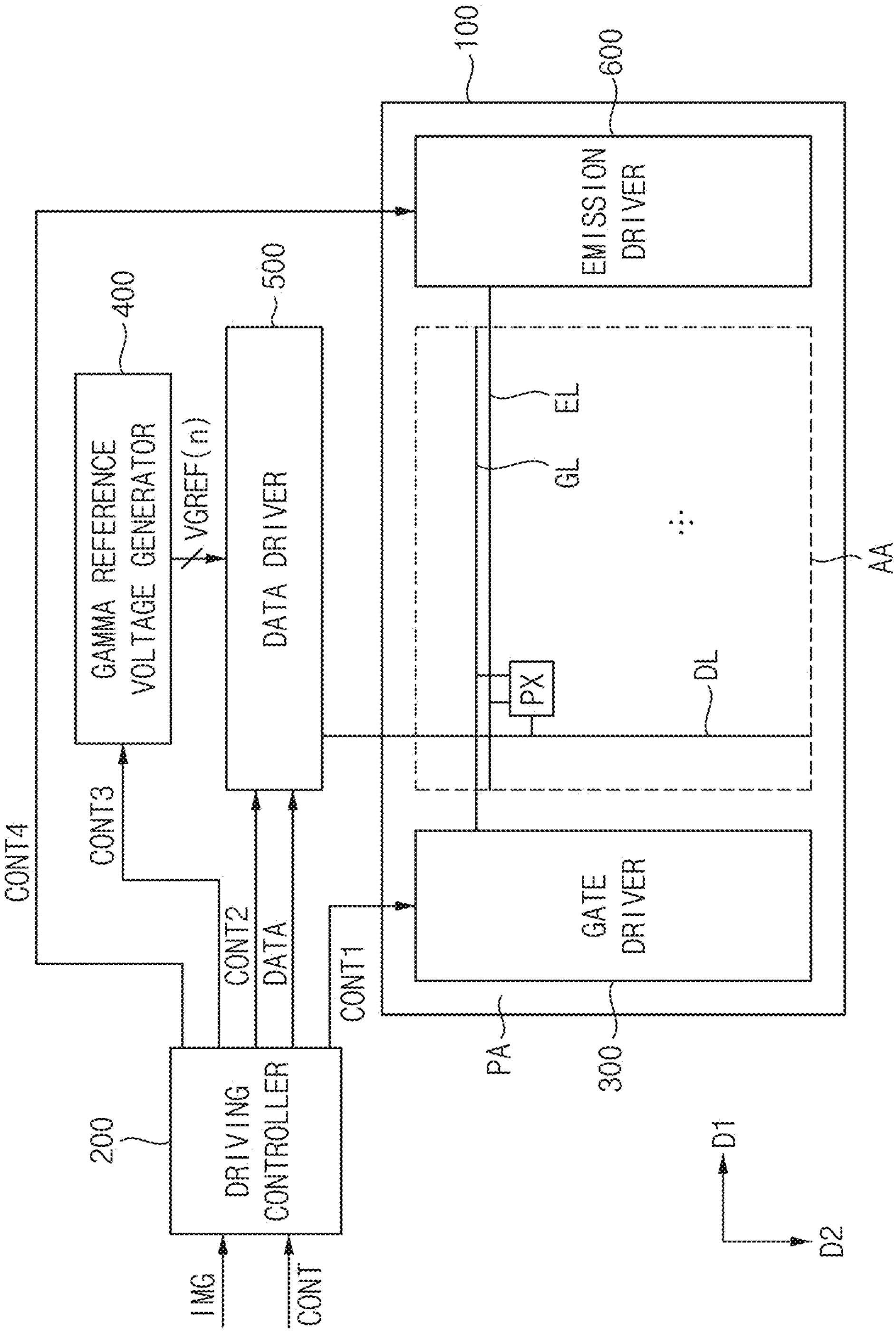
FIG. 1 is a block diagram illustrating a display apparatus according to some embodiments of the present disclosure.

FIG. 1 is a block diagram illustrating a display apparatus according to some embodiments of the present disclosure.

Referring to FIG. 1, the display apparatus includes aspects of a display panel 100 and a display panel driver. The display panel driver includes a driving controller 200, a gate driver 300, a gamma reference voltage generator 400, a data driver 500 and an emission driver 600.

The display panel 100 has a display region AA at which images are displayed and a peripheral region PA adjacent to (e.g., surrounding, in a periphery, or outside a footprint of) the display region AA.

The display panel 100 may include a plurality of gate lines GL, a plurality of data lines DL, a plurality of emission lines EL and a plurality of pixels PX electrically connected to the gate lines GL, the data lines DL and the emission lines EL. The gate lines GL may extend in a first direction D1, the data lines DL may extend in a second direction D2 crossing the first direction D1 and the emission lines EL may extend in the first direction D1.

The driving controller 200 may receive input image data IMG and an input control signal CONT from an external apparatus. For example, the input image data IMG may include red image data, green image data and blue image data. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 generates the fourth control signal CONT4 for controlling an operation of the emission driver 600 based on the input control signal CONT, and outputs the fourth control signal CONT4 to the emission driver 600.

The gate driver 300 generates gate signals driving the gate lines GL in response to the first control signal CONT1 received from the driving controller 200. The gate driver 300 may output the gate signals to the gate lines GL. For example, the gate driver 300 may be integrated on the peripheral region PA of the display panel 100. For example, the gate driver 300 may be mounted on the peripheral region PA of the display panel 100.

The gamma reference voltage generator 400 generates a gamma reference voltage VGREF(n) in response to the third control signal CONT3 received from the driving controller 200. The gamma reference voltage generator 400 provides the gamma reference voltage VGREF(n) to the data driver 500. The gamma reference voltage VGREF(n) is used for converting the data signal DATA into the data voltage having an analog type.

According to some embodiments, the gamma reference voltage generator 400 may be located in the driving controller 200, or in the data driver 500.

The data driver 500 receives the second control signal CONT2 and the data signal DATA from the driving controller 200, and receives the gamma reference voltages VGREF(n) from the gamma reference voltage generator 400. The data driver 500 converts the data signals DATA into the data voltages having an analog type using the gamma reference voltages VGREF(n). The data driver 500 outputs the data voltages to the data lines DL.

The emission driver 600 generates emission signals to drive the emission lines EL in response to the fourth control signal CONT4 received from the driving controller 200. The emission driver 600 may output the emission signals to the emission lines EL. For example, the emission driver 600 may be integrated on the peripheral region PA of the display panel 100. For example, the emission driver 600 may be mounted on the peripheral region PA of the display panel 100.

Although the gate driver 300 is located at a first side of the display panel 100 and the emission driver 600 is located at a second side of the display panel 100 opposite to the first side in FIG. 1 for convenience of explanation, embodiments according to the present disclosure are not limited thereto. For example, both of the gate driver 300 and the emission driver 600 may be located at the first side of the display panel 100. For example, the gate driver 300 and the emission driver 600 may be integrally formed.

Figure 2:
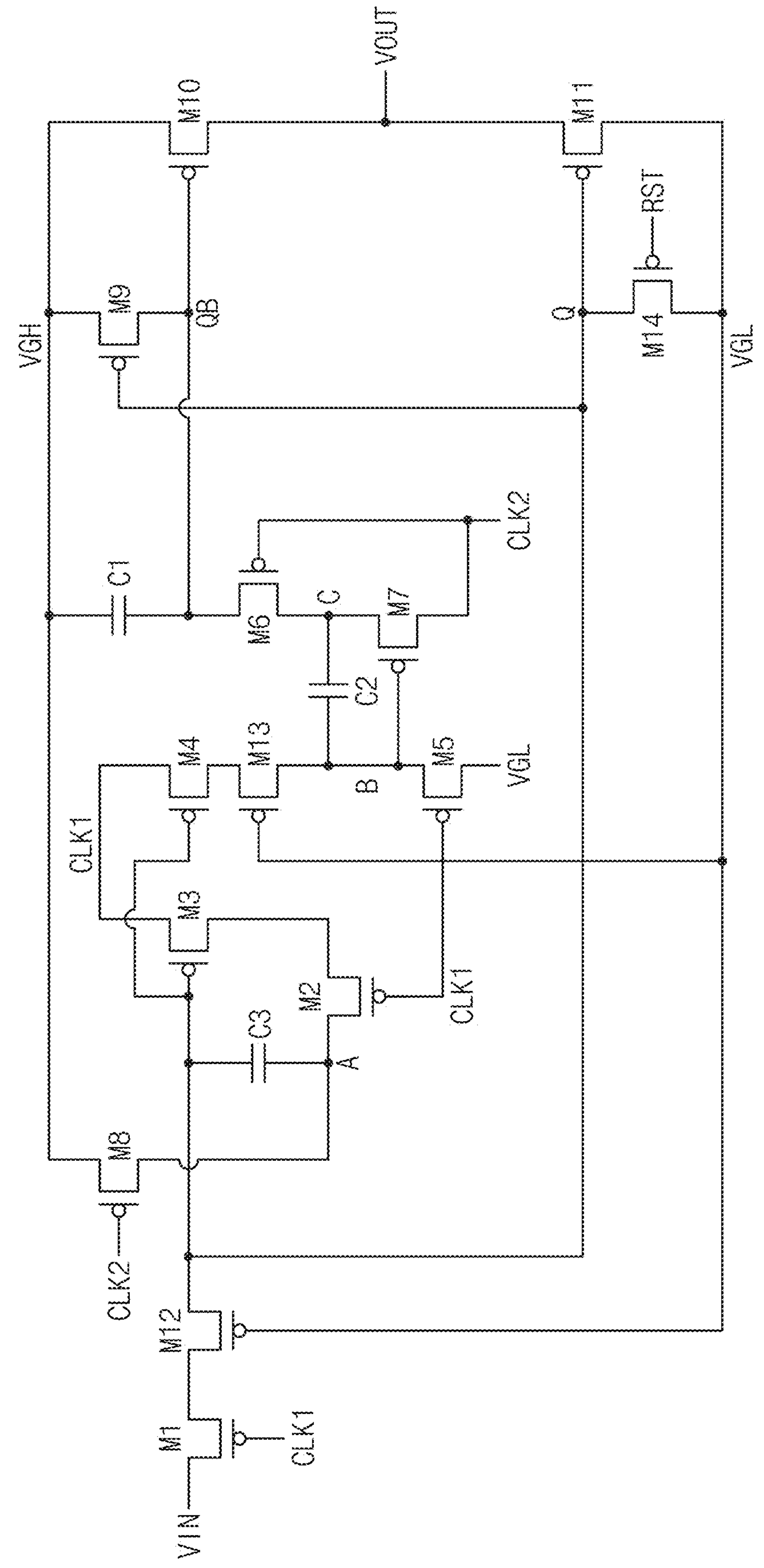
FIG. 2 is a circuit diagram illustrating aspects of a gate driver of FIG. 1.

FIG. 2 is a circuit diagram illustrating aspects of a gate driver of FIG. 1 (e.g., a stage of a gate driver). Although FIG. 2 illustrates various components in a gate driver according to some embodiments, according to some embodiments the gate driver may include additional components, or fewer components, without departing from the spirit and scope of embodiments according to the present disclosure.

Figure 3:
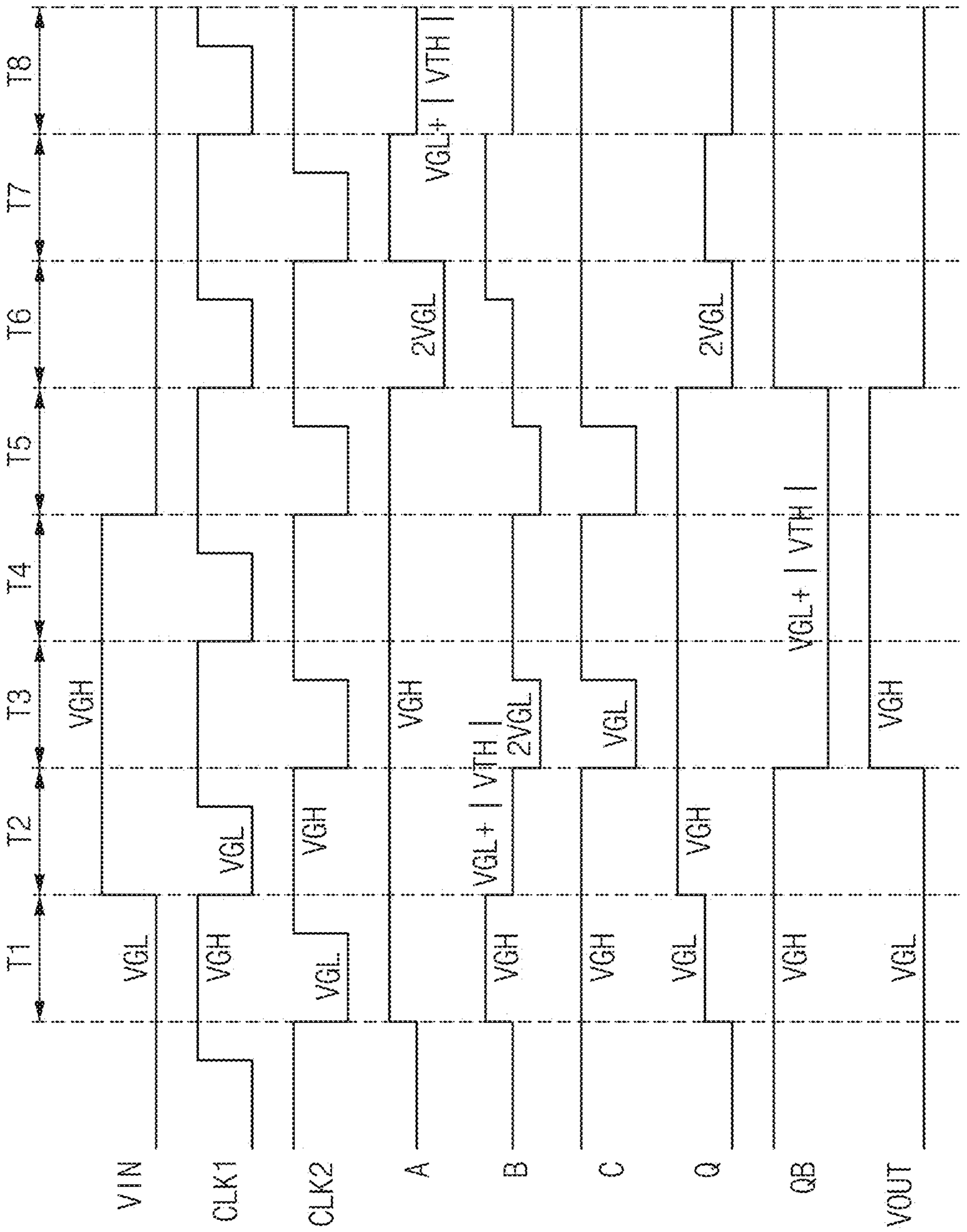
FIG. 3 is a timing diagram illustrating input signals, node signals and output signals of the gate driver of FIG. 2.

FIG. 3 is a timing diagram illustrating input signals, node signals and output signals of the gate driver of FIG. 2.

Referring to FIGS. 1 to 3, the gate driver 300 may include a plurality of stages.

A high power voltage VGH, a low power voltage VGL, a first clock signal CLK1 and a second clock signal CLK2 may be applied to the stages. In addition, a reset signal RST may be applied to the stages.

The first clock signal CLK1 and the second clock signal CLK2 may be alternately applied to the stages. For example, the first clock signal CLK1 may be applied to a first clock terminal of a first stage and the second clock signal CLK2 may be applied to a second clock terminal of the first stage. In contrast, the second clock signal CLK2 may be applied to a first clock terminal of a second stage and the first clock signal CLK1 may be applied to a second clock terminal of the second stage.

Like the first stage, the first clock signal CLK1 may be applied to a first clock terminal of a third stage and the second clock signal CLK2 may be applied to a second clock terminal of the third stage. Like the second stage, the second clock signal CLK2 may be applied to a first clock terminal of a fourth stage and the first clock signal CLK1 may be applied to a second clock terminal of the fourth stage.

The vertical start signal may be applied to an input terminal of the first stage. A gate output signal of the first stage may be applied to an input terminal of the second stage. A gate output signal of the second stage may be applied to an input terminal of the third stage. A gate output signal of the third stage may be applied to an input terminal of the fourth stage.

Gate output terminals of the first to fourth stages may output first to fourth gate output signals.

The gate driver 300 includes an input circuit transmitting an input signal VIN to a Q-node in response to the first clock signal CLK1, a first A-node control circuit controlling a signal of an A-node in response to the first clock signal CLK1 or a signal of the Q-node, a second A-node control circuit controlling a signal of the A-node in response to the second clock signal CLK2, a B-node control circuit controlling a signal of a B-node in response to the signal of the Q-node, a C-node control circuit controlling a signal of a C-node in response to the signal of the B-node, a first QB-node control circuit controlling a signal of a QB-node in response to the second clock signal CLK2, a second QB-node control circuit controlling the signal of the QB-node in response to the signal of the Q-node, a pull-up circuit pulling up a gate output signal VOUT to the high power voltage VGH in response to the signal of the QB-node and a pull-down circuit pulling down the gate output signal VOUT to the low power voltage VGL.

The gate driver 300 may further include a first capacitor C1 including a first electrode receiving the high power voltage VGH and a second electrode connected to the QB-node.

The gate driver 300 may further include a second capacitor C2 including a first electrode connected to the B-node and a second electrode connected to the C-node.

The gate driver 300 may further include a third capacitor C3 including a first electrode connected to the Q-node and a second electrode connected to the A-node.

For example, the input circuit may include a first transistor M1 including a control electrode receiving the first clock signal CLK1, a first electrode receiving the input signal VIN and a second electrode connected to a first intermediate node and a twelfth transistor M12 including a control electrode receiving the low power voltage VGL, a first electrode connected to the first intermediate node and a second electrode connected to the Q-node.

For example, the first A-node control circuit may include a second transistor M2 including a control electrode receiving the first clock signal CLK1, a first electrode connected to the A-node and a second electrode connected to a second intermediate node and a third transistor M3 including a control electrode receiving the first clock signal CLK1, a first electrode receiving the first clock signal CLK1 and a second electrode connected to the second intermediate node.

For example, the second A-node control circuit may include an eighth transistor M8 including a control electrode receiving the second clock signal CLK2, a first electrode receiving the high power voltage VGH and a second electrode connected to the A-node.

For example, the B-node control circuit may include a fourth transistor M4 including a control electrode connected to the Q-node, a first electrode receiving the first clock signal CLK1 and a second electrode connected to a third intermediate node, a thirteenth transistor M13 including a control electrode receiving the low power voltage VGL, a first electrode connected to the third intermediate node and a second electrode connected to the B-node and a fifth transistor M5 including a control electrode receiving the first clock signal CLK1, a first electrode receiving the low power voltage VGL and a second electrode connected to the B-node.

For example, the C-node control circuit may include a seventh transistor M7 including a control electrode connected to the B-node, a first electrode receiving the second clock signal CLK2 and a second electrode connected to the C-node.

For example, the first QB-node control circuit may include a sixth transistor M6 including a control electrode connected to the second clock signal CLK2, a first electrode connected to the QB-node and a second electrode connected to the C-node.

For example, the second QB-node control circuit may include a ninth transistor M9 including a control electrode connected to the Q-node, a first electrode receiving the high power voltage VGH and a second electrode connected to the QB-node.

For example, the pull-up circuit may include a tenth transistor M10 including a control electrode connected to the QB-node, a first electrode receiving the high power voltage VGH and a second electrode connected to a gate output terminal.

For example, the pull-down circuit may include an eleventh transistor M11 including a control electrode connected to the Q-node, a first electrode receiving the low power voltage VGL and a second electrode connected to the gate output terminal.

For example, the gate driver 300 may further include a reset circuit resetting the signal of the Q-node based on a reset signal RST. For example, the reset circuit may further include a fourteenth transistor M14 including a control electrode receiving the reset signal RST, a first electrode receiving the low power voltage VGL and a second electrode connected to the Q-node.

The reset signal RST may have an active level in an initial powered-on period of the display apparatus. By the reset signal RST, instances of the display panel 100 unintentionally emitting a light during a period in which the display panel 100 is powered on may be prevented or reduced.

For example, the first to fourteenth transistors M1 to M14 may be P-type transistors. For example, the first to fourteenth transistors M1 to M14 may be P-type low temperature polycrystalline silicon (LTPS) transistors.

For example, the first transistor M1, the second transistor M2 and the fifth transistor M5 may be turned on and off by the first clock signal CLK1.

For example, the third transistor M3, the fourth transistor M4, the ninth transistor M9 and the eleventh transistor M11 may be turned on and off by the signal of the Q-node.

For example, the sixth transistor M6 and the eighth transistor M8 may be turned on and off by the second clock signal CLK2.

For example, the seventh transistor M7 may be turned on and off by the signal of the B-node.

For example, the tenth transistor M10 may be turned on and off by the signal of the QB-node.

For example, the low power voltage VGL is applied to the control electrode of the twelfth transistor M12 and the control electrode of the thirteenth transistor M13 so that the twelfth transistor M12 and the thirteenth transistor M13 may be always turned on.

For example, the fourteenth transistor M14 may be turned on and off by the reset signal RST.

Figure 4:
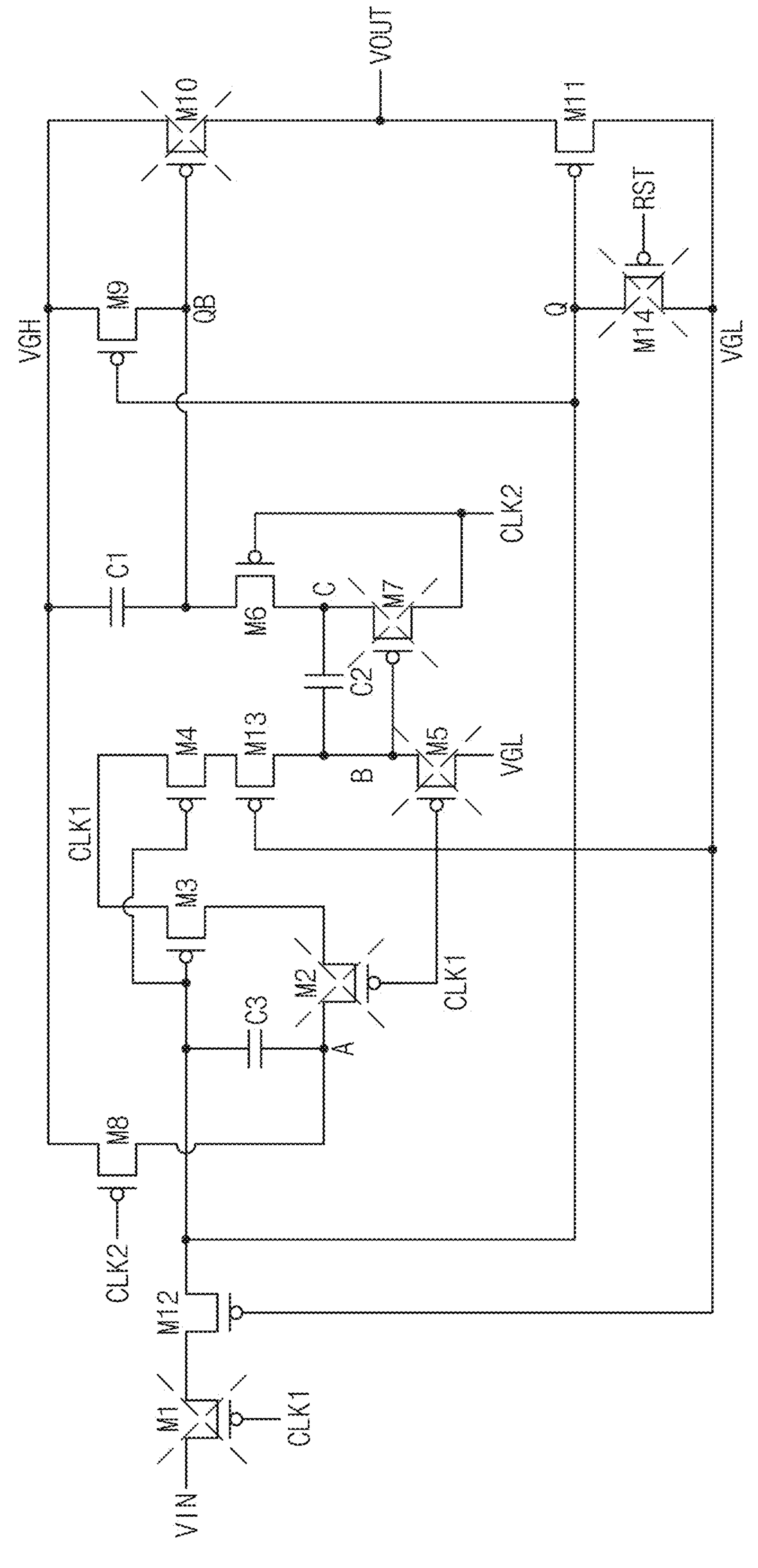
FIG. 4 is a circuit diagram illustrating further details of the gate driver of FIG. 2 in a first driving period.
Figure 5:
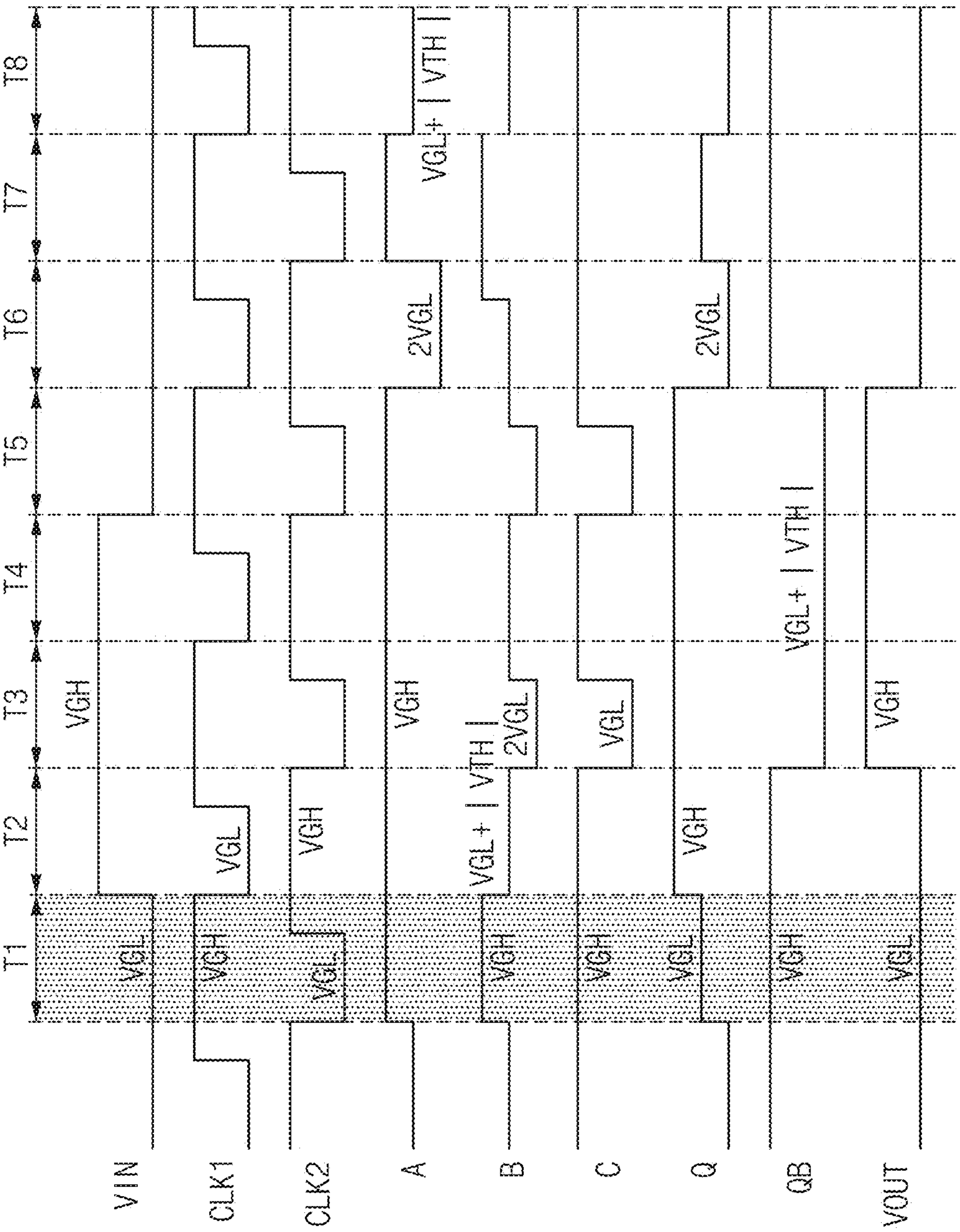
FIG. 5 is a timing diagram illustrating the input signals, the node signals and the output signals of the gate driver of FIG. 2 in the first driving period.

FIG. 4 is a circuit diagram illustrating the gate driver 300 of FIG. 2 in a first driving period T1. FIG. 5 is a timing diagram illustrating the input signals, the node signals and the output signals of the gate driver 300 of FIG. 2 in the first driving period T1.

Referring to FIGS. 4 and 5, for example, the input signal VIN may have a low level (e.g. VGL) in the first driving period T1, the first clock signal CLK1 may have a high level (e.g. VGH) in the first driving period T1, the second clock signal CLK2 may have a low level (e.g. VGL) in the first driving period T1, the signal of the Q-node may have a low level (e.g. VGL) in the first driving period T1, the signal of the QB-node may have a high level (e.g. VGH) in the first driving period T1 and the gate output signal VOUT may have a low level (e.g. VGL) in the first driving period T1.

In the first driving period T1, the eighth transistor M8 may be turned on by the low level of the second clock signal CLK2, the high power voltage VGH is applied to the A-node by the eighth transistor M8 so that the signal of the A-node may have a high level (e.g. VGH).

When the signal of the A-node is changed from a low level (e.g. VGL+|VTH|, herein, |VTH| is a threshold voltage of one of the first to fourteenth transistors M14) to the high level (e.g. VGH) in the first driving period T1, the signal of the Q-node may be changed from a second low level (e.g. 2VGL) to the low level (e.g. VGL) by the third capacitor C3.

In the first driving period T1, the signal of the Q-node has the low level (e.g. VGL) so that the third transistor M3, the fourth transistor M4, the ninth transistor M9 and the eleventh transistor M11 may be turned on by the signal of the Q-node.

In the first driving period T1, the high level (e.g. VGH) of the first clock signal CLK1 may be applied to the B-node by the fourth transistor M4 and the thirteenth transistor M13 so that the signal of the B-node may have the high level.

In the first driving period T1, the high power voltage VGH may be applied to the QB-node by the ninth transistor M9 so that the signal of the QB-node may have the high level.

In the first driving period T1, the sixth transistor M6 may be turned on by the low level of the second clock signal CLK2 and the signal (e.g. VGH) of the QB-node may also be applied to the C-node by the sixth transistor M6 so that the signal of the C-node may have the high level.

In the first driving period T1, the low power voltage VGL may be outputted as the gate output signal VOUT by the eleventh transistor M11 which is turned on by the signal of the Q-node.

In the first driving period T1, the first transistor M1, the second transistor M2, the fifth transistor M5, the seventh transistor M7, the tenth transistor M10 and the fourteenth transistor M14 may be turned off.

Figure 6:
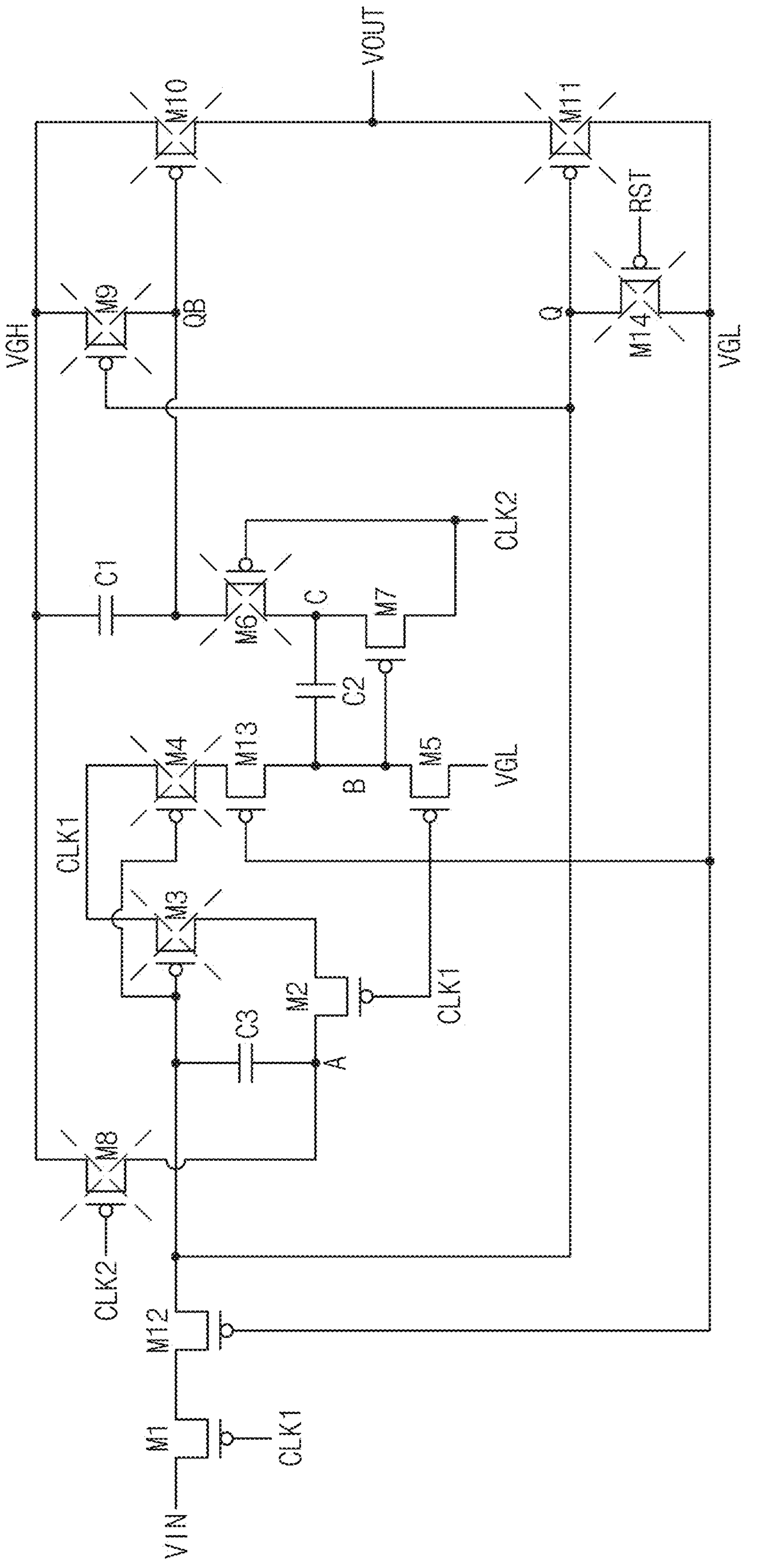
FIG. 6 is a circuit diagram illustrating the gate driver of FIG. 2 in a second driving period.
Figure 7:
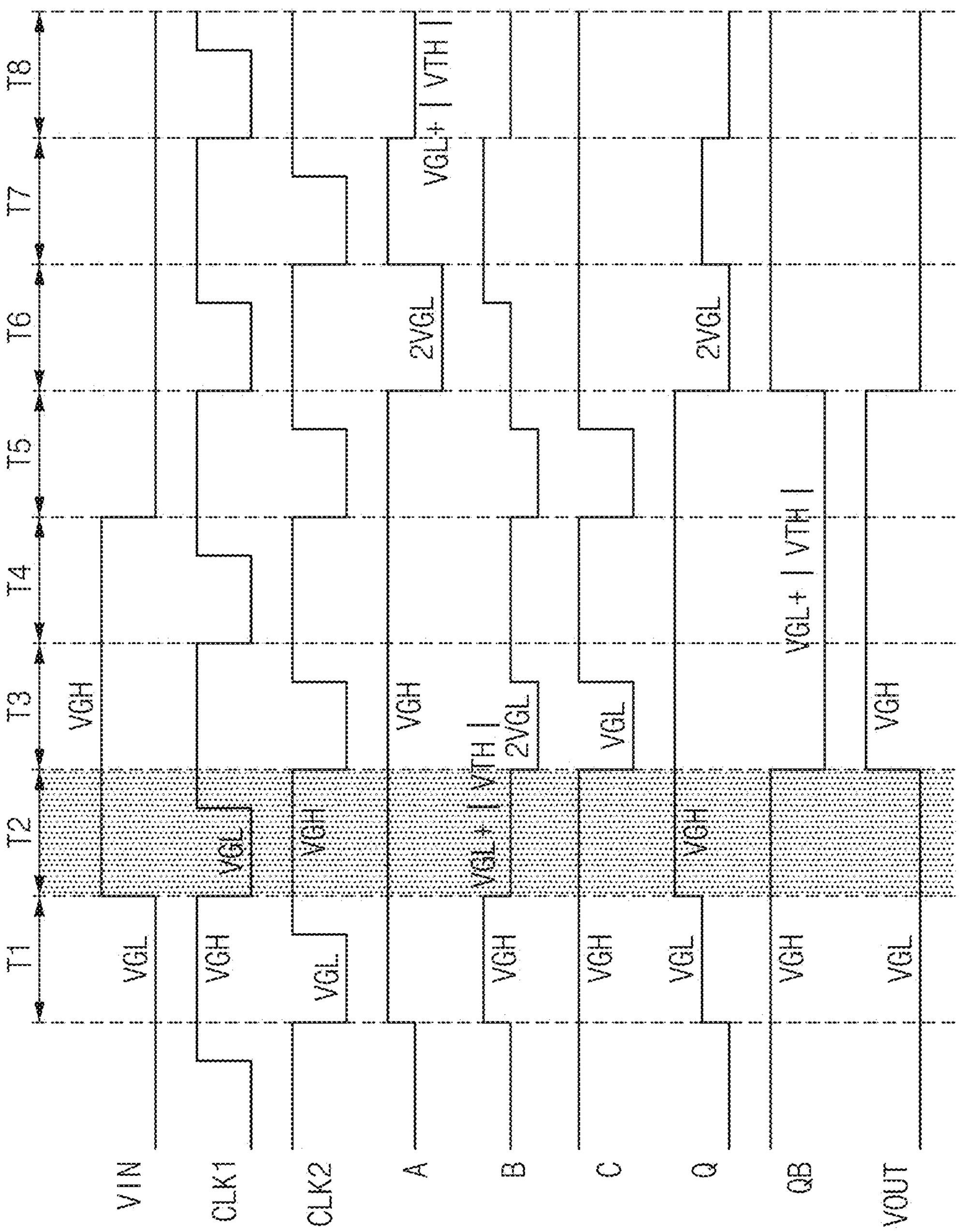
FIG. 7 is a timing diagram illustrating the input signals, the node signals and the output signals of the gate driver of FIG. 2 in the second driving period.

FIG. 6 is a circuit diagram illustrating the gate driver 300 of FIG. 2 in a second driving period T2. FIG. 7 is a timing diagram illustrating the input signals, the node signals and the output signals of the gate driver 300 of FIG. 2 in the second driving period T2.

Referring to FIGS. 6 and 7, for example, the input signal VIN may have a high level (e.g. VGH) in the second driving period T2 subsequent to the first driving period T1, the first clock signal CLK1 may have a low level (e.g. VGL) in the second driving period T2, the second clock signal CLK2 may have a high level (e.g. VGH) in the second driving period T2, the signal of the Q-node may have a high level (e.g. VGH) in the second driving period T2, the signal of the QB-node may have the high level (e.g. VGH) in the second driving period T2 and the gate output signal VOUT may have the low level (e.g. VGL) in the second driving period T2.

In the second driving period T2, the first transistor M1, the second transistor M2 and the fifth transistor M5 may be turned on by the low level of the first clock signal CLK1.

In the second driving period T2, the low power voltage VGL may be applied to the B-node in response to the turned-on fifth transistor M5 so that the signal of the B-node may have the low level (e.g. VGL+|VTH|). In the second driving period T2, the seventh transistor M7 may be turned on by the low level of the signal of the B-node. For example, VGL is applied to the control electrode and an input electrode (the first electrode) of the fifth transistor M5 so that VGL+|VTH| including a threshold voltage component of the fifth transistor M5 may be transmitted to the B-node.

In the second driving period T2, the third transistor M3 and the eighth transistor M8 which are connected to the A-node may be turned off so that the signal of the A-node may maintain the high level which is a previous state.

When the seventh transistor M7 is turned on in the second driving period T2, the high level of the second clock signal CLK2 may be applied to the C-node so that the signal of the C-node may have the high level.

In the second driving period T2, the high level of the input signal VIN may be transmitted to the Q-node by the first transistor M1 and the twelfth transistor M12 which are turned on so that the signal of the Q-node may have the high level.

In the second driving period T2, the sixth transistor M6 and the ninth transistor M9 which are connected to the QB-node may be turned off so that the signal of the QB-node may maintain the high level which is a previous state.

In the second driving period T2, the tenth transistor M10 and the eleventh transistor M11 may be turned off so that the gate output signal VOUT may maintain the low level which is a previous state.

In the second driving period T2, the third transistor M3, the fourth transistor M4, the sixth transistor M6, the eighth transistor M8, the ninth transistor M9, the tenth transistor M10, the eleventh transistor M11 and the fourteenth transistor M14 may be turned off.

Figure 8:
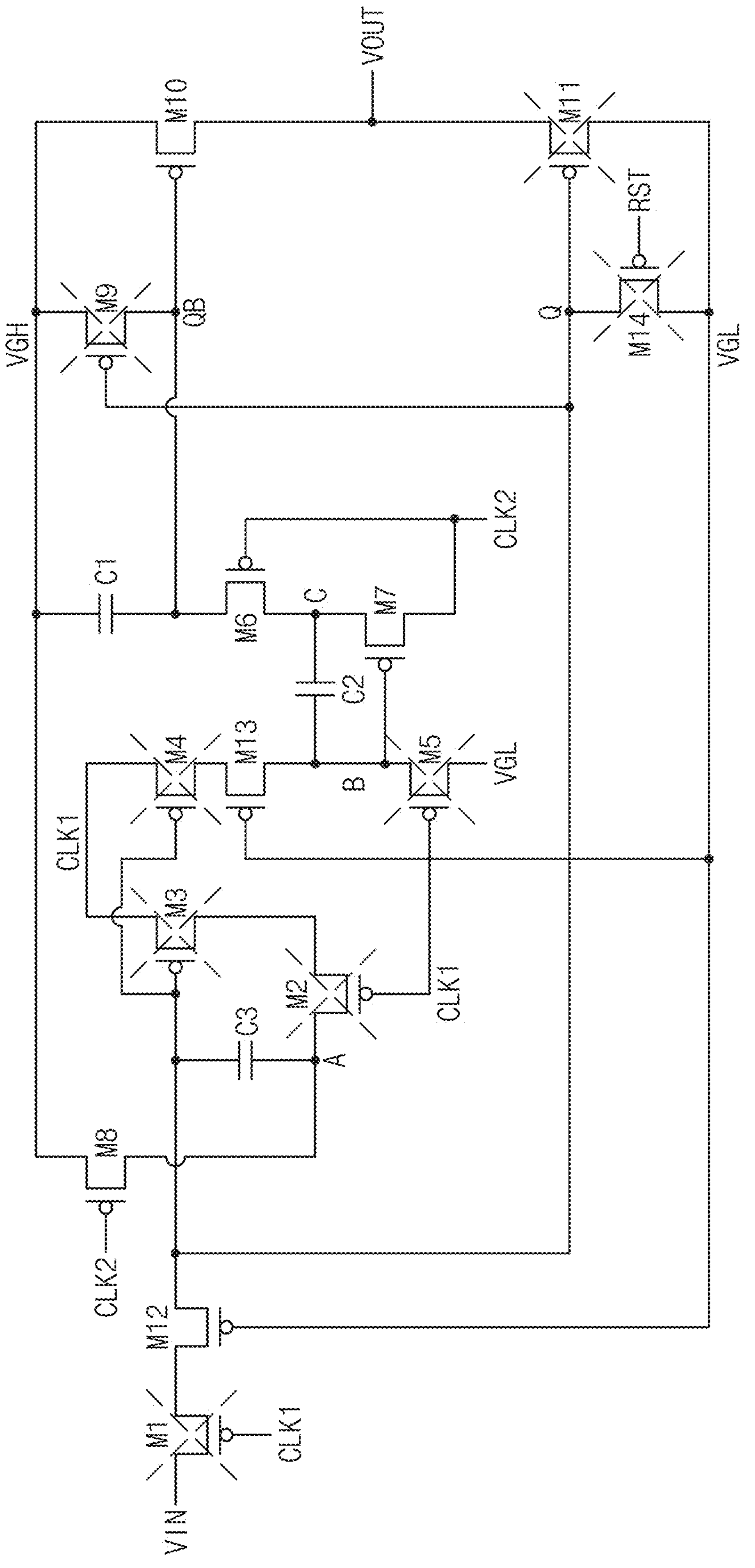
FIG. 8 is a circuit diagram illustrating further details of the gate driver of FIG. 2 in a third driving period.
Figure 9:
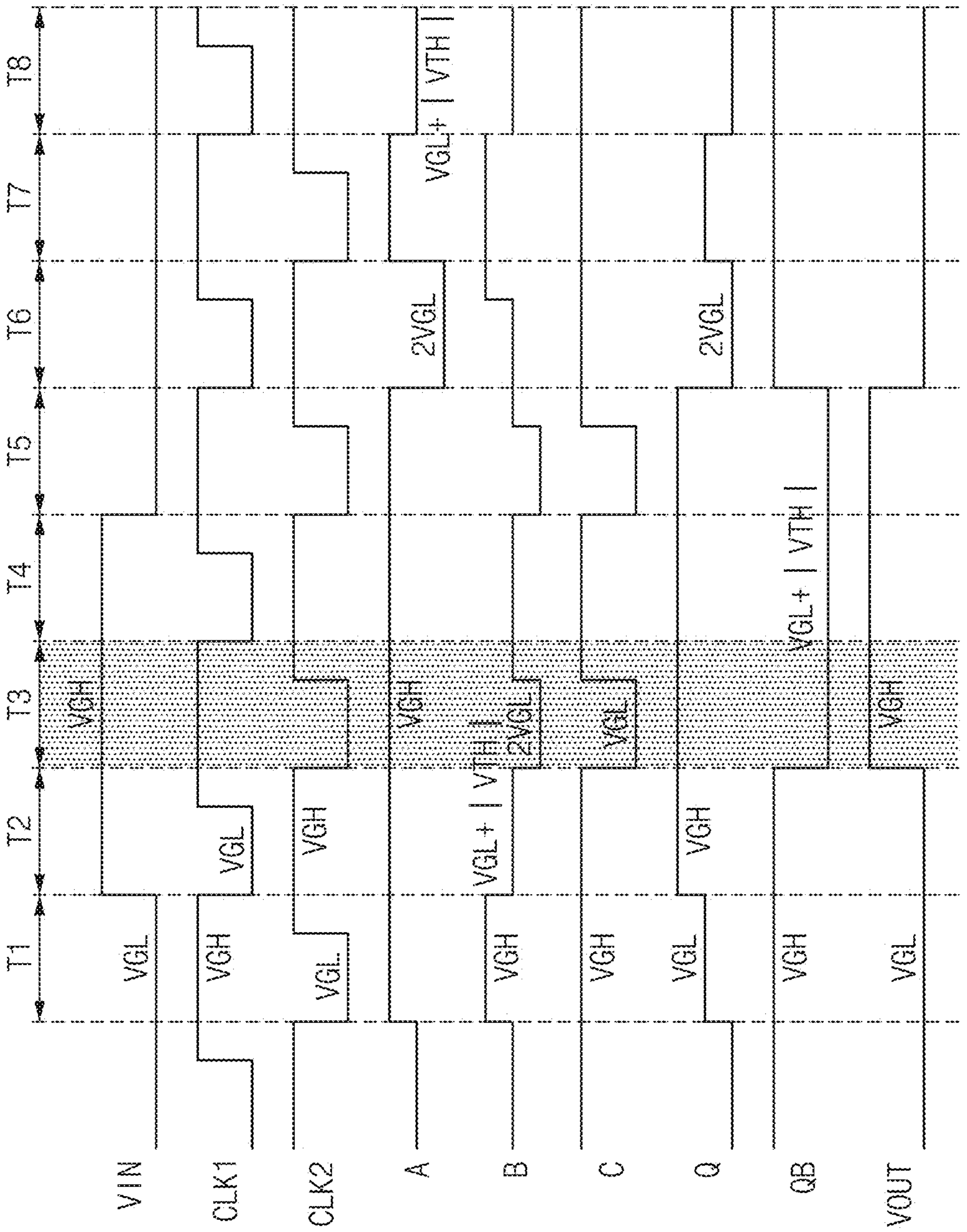
FIG. 9 is a timing diagram illustrating the input signals, the node signals and the output signals of the gate driver of FIG. 2 in the third driving period.

FIG. 8 is a circuit diagram illustrating the gate driver 300 of FIG. 2 in a third driving period T3. FIG. 9 is a timing diagram illustrating the input signals, the node signals and the output signals of the gate driver 300 of FIG. 2 in the third driving period T3.

Referring to FIGS. 8 and 9, for example, the input signal VIN may have the high level in the third driving period T3 subsequent to the second driving period T2, the first clock signal CLK1 may have the high level in the third driving period T3, the second clock signal CLK2 may have the low level in the third driving period T3, the signal of the Q-node may have the high level in the third driving period T3, the signal of the QB-node may have a low level (e.g. VGL+|VTH|) in the third driving period T3 and the gate output signal VOUT may have a high level (e.g. VGH) in the third driving period T3.

In the third driving period T3, the eighth transistor M8 may be turned on by the low level of the second clock signal CLK2 and the high power voltage VGH may be applied to the A-node by the eighth transistor M8 so that the signal of the A-node may have the high level.

In the third driving period T3, the first transistor M1 connected to the Q-node may be turned off so that the signal of the Q-node may maintain the high level which is a previous state.

In the third driving period T3, the fourth transistor M4 and the fifth transistor M5 which are connected to the B-node may be turned off so that the signal of the B-node may maintain the low level (e.g. VGL+|VTH|) which is a previous state first.

In the third driving period T3, the sixth transistor M6 may be turned on by the low level of the second clock signal CLK2 and the low level of the second clock signal CLK2 may be applied to the C-node by the turned-on seventh transistor M7 so that the signal of the C-node may have the low level.

When the low level of the second clock signal CLK2 is applied to the C-node in the third driving period T3, the signal of the B-node may be decreased to a second low level (e.g. 2VGL) by the second capacitor C2.

In the third driving period T3, the low level of the second clock signal CLK2 may be transmitted to the QB-node by the seventh transistor M7 and the sixth transistor M6 which are turned on so that the signal of the QB-node may have the low level (e.g. VGL+|VTH|). For example, in the third driving period T3, VGL is applied to the control electrode and an input electrode (the second electrode) of the sixth transistor M6 so that VGL+|VTH| including a threshold voltage component of the sixth transistor M6 may be transmitted to the QB-node.

In the third driving period T3, the high power voltage VGH may be outputted as the gate output signal VOUT by the tenth transistor M10 which is turned on by the signal of the QB-node.

In the third driving period T3, the first transistor M1, the second transistor M2, the third transistor M3, the fourth transistor M4, the fifth transistor M5, the ninth transistor M9, the eleventh transistor M11 and the fourteenth transistor M14 may be turned off.

Figure 10:
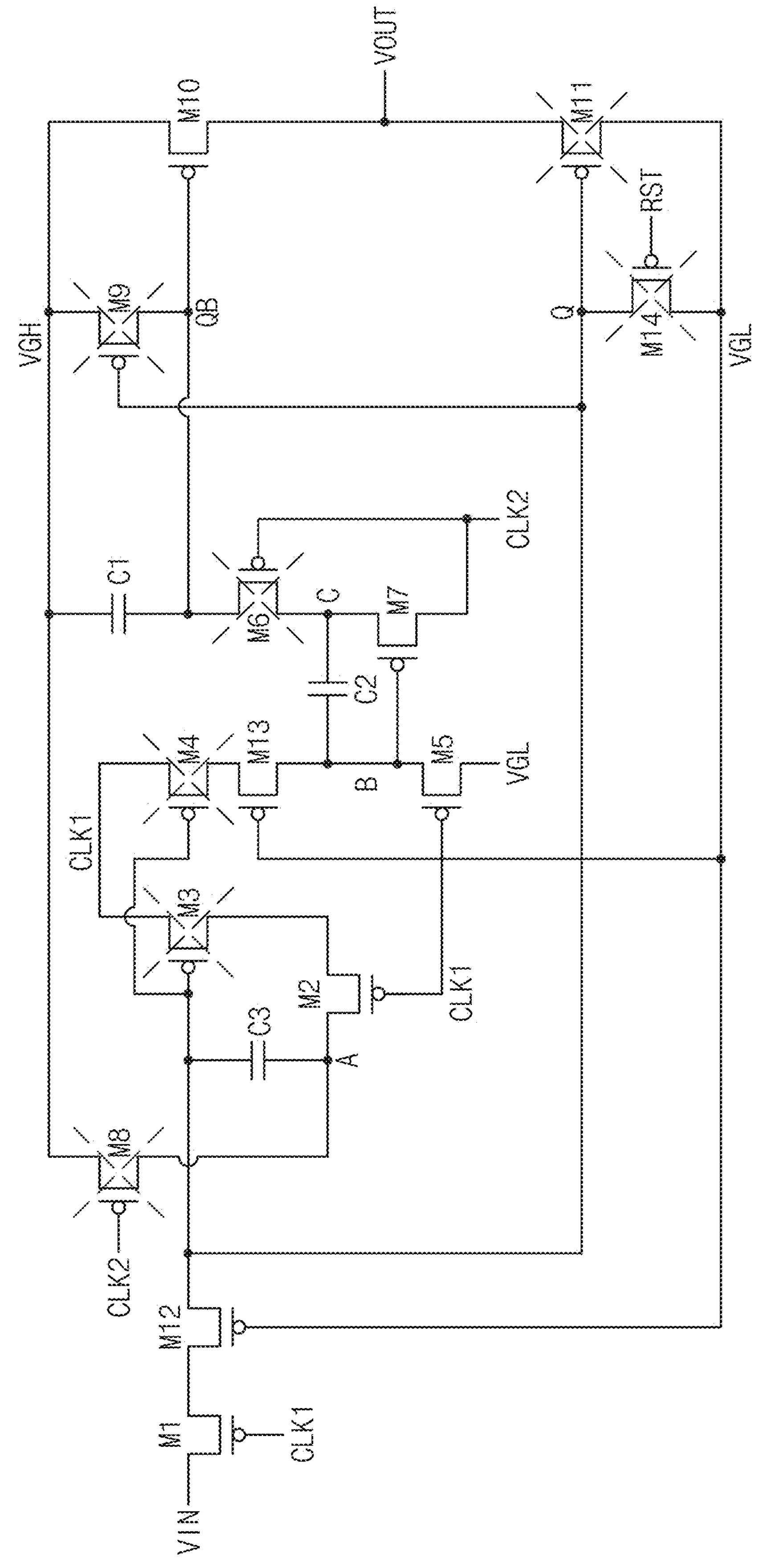
FIG. 10 is a circuit diagram illustrating further details of the gate driver of FIG. 2 in a fourth driving period.
Figure 11:
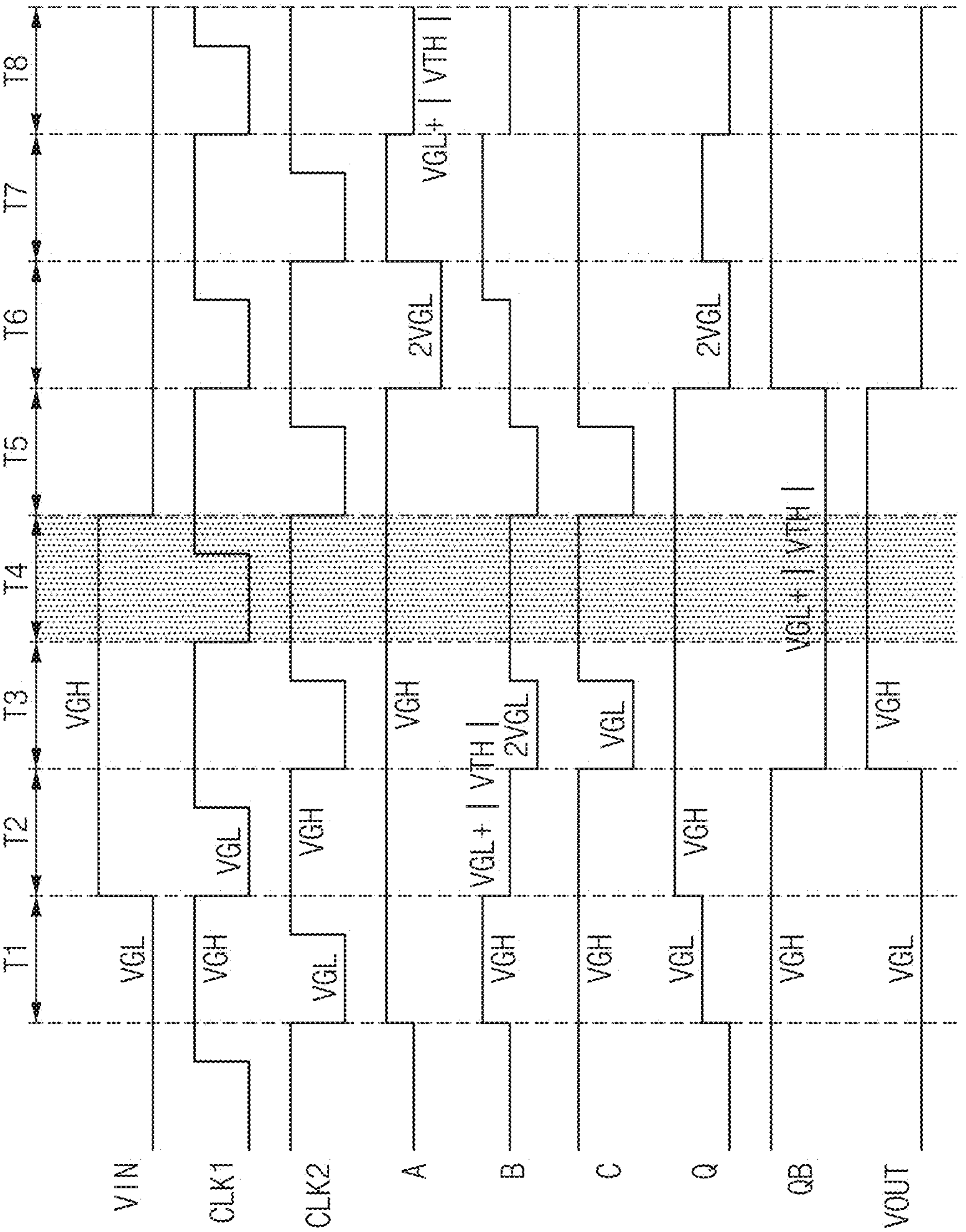
FIG. 11 is a timing diagram illustrating the input signals, the node signals and the output signals of the gate driver of FIG. 2 in the fourth driving period.

FIG. 10 is a circuit diagram illustrating the gate driver 300 of FIG. 2 in a fourth driving period T4. FIG. 11 is a timing diagram illustrating the input signals, the node signals and the output signals of the gate driver 300 of FIG. 2 in the fourth driving period T4.

Referring to FIGS. 10 and 11, for example, the input signal VIN may have the high level in the fourth driving period T4 subsequent to the third driving period T3, the first clock signal CLK1 may have the low level in the fourth driving period T4, the second clock signal CLK2 may have the high level in the fourth driving period T4, the signal of the Q-node may have the high level in the fourth driving period T4, the signal of the QB-node may have the low level in the fourth driving period T4 and the gate output signal VOUT may have the high level in the fourth driving period T4.

In the fourth driving period T4, the first transistor M1, the second transistor M2 and the fifth transistor M5 may be turned on by the low level of the first clock signal CLK1.

In the fourth driving period T4, the low power voltage VGL may be applied to the B-node in response to the turned-on fifth transistor M5 so that the signal of the B-node may have the low level (e.g. VGL+|VTH|). In the fourth driving period T4, the seventh transistor M7 may be turned on by the low level of the signal of the B-node.

In the fourth driving period T4, the third transistor M3 and the eighth transistor M8 which are connected to the A-node may be turned off so that the signal of the A-node may maintain the high level which is a previous state.

When the seventh transistor M7 is turned on in the fourth driving period T4, the high level of the second clock signal CLK2 may be applied to the C-node so that the signal of the C-node may have the high level.

In the fourth driving period T4, the high level of the input signal VIN may be transmitted to the Q-node by the first transistor M1 and the twelfth transistor M12 which are turned on so that the signal of the Q-node may have the high level.

In the fourth driving period T4, the sixth transistor M6 and the ninth transistor M9 which are connected to the QB-node may be turned off so that the signal of the QB-node may maintain the low level (e.g. VGL+|VTH|) which is a previous state.

In the fourth driving period T4, the high power voltage VGH may be outputted as the gate output signal VOUT by the tenth transistor M10 which is turned on by the signal of the QB-node.

In the fourth driving period T4, the third transistor M3, the fourth transistor M4, the sixth transistor M6, the eighth transistor M8, the ninth transistor M9, the eleventh transistor M11 and the fourteenth transistor M14 may be turned off.

Figure 12:
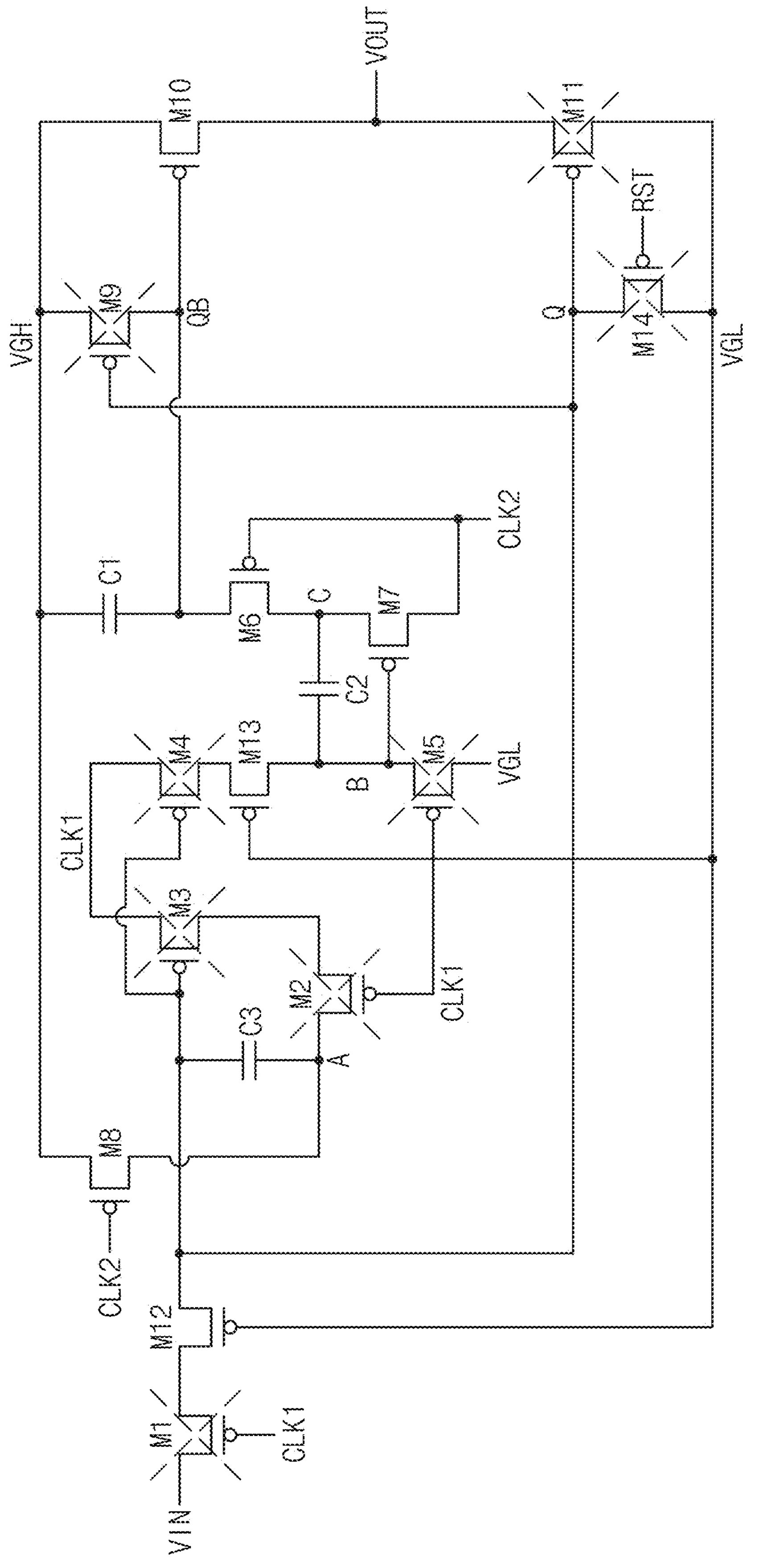
FIG. 12 is a circuit diagram illustrating further details of the gate driver of FIG. 2 in a fifth driving period.
Figure 13:
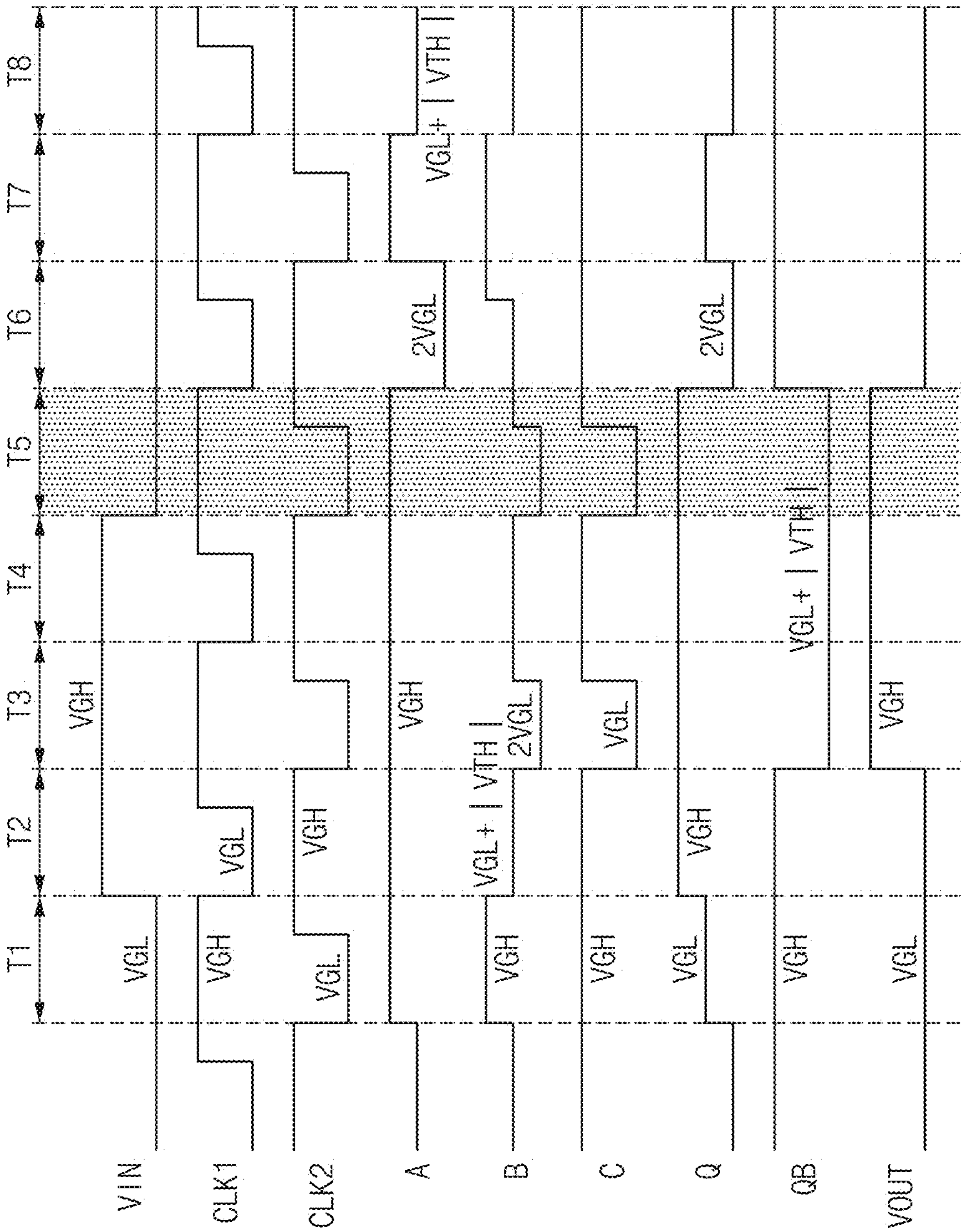
FIG. 13 is a timing diagram illustrating the input signals, the node signals and the output signals of the gate driver of FIG. 2 in the fifth driving period.

FIG. 12 is a circuit diagram illustrating the gate driver 300 of FIG. 2 in a fifth driving period T5. FIG. 13 is a timing diagram illustrating the input signals, the node signals and the output signals of the gate driver 300 of FIG. 2 in the fifth driving period T5.

Referring to FIGS. 12 and 13, for example, the input signal VIN may have the low level in the fifth driving period T5 subsequent to the fourth driving period T4, the first clock signal CLK1 may have the high level in the fifth driving period T5, the second clock signal CLK2 may have the low level in the fifth driving period T5, the signal of the Q-node may have the high level in the fifth driving period T5, the signal of the QB-node may have the low level in the fifth driving period T5 and the gate output signal VOUT may have the high level in the fifth driving period T5.

In the fifth driving period T5, the eighth transistor M8 may be turned on by the low level of the second clock signal CLK2 and the high power voltage VGH may be applied to the A-node by the eighth transistor M8 so that the signal of the A-node may have the high level.

In the fifth driving period T5, the first transistor M1 connected to the Q-node may be turned off so that the signal of the Q-node may maintain the high level which is a previous state.

In the fifth driving period T5, the fourth transistor M4 and the fifth transistor M5 which are connected to the B-node may be turned off so that the signal of the B-node may maintain the low level (e.g. VGL+|VTH|) which is a previous state first.

In the fifth driving period T5, the sixth transistor M6 may be turned on by the low level of the second clock signal CLK2 and the low level of the second clock signal CLK2 may be applied to the C-node by the turned-on seventh transistor M7 so that the signal of the C-node may have the low level.

When the low level of the second clock signal CLK2 is applied to the C-node in the fifth driving period T5, the signal of the B-node may be decreased to a second low level (e.g. 2VGL) by the second capacitor C2.

In the fifth driving period T5, the low level of the second clock signal CLK2 may be transmitted to the QB-node by the seventh transistor M7 and the sixth transistor M6 which are turned on so that the signal of the QB-node may have the low level (e.g. VGL+|VTH|). For example, in the fifth driving period T5, VGL is applied to the control electrode and an input electrode (the second electrode) of the sixth transistor M6 so that VGL+|VTH| including a threshold voltage component of the sixth transistor M6 may be transmitted to the QB-node.

In the fifth driving period T5, the high power voltage VGH may be outputted as the gate output signal VOUT by the tenth transistor M10 which is turned on by the signal of the QB-node.

In the fifth driving period T5, the first transistor M1, the second transistor M2, the third transistor M3, the fourth transistor M4, the fifth transistor M5, the ninth transistor M9, the eleventh transistor M11 and the fourteenth transistor M14 may be turned off.

Figure 14:
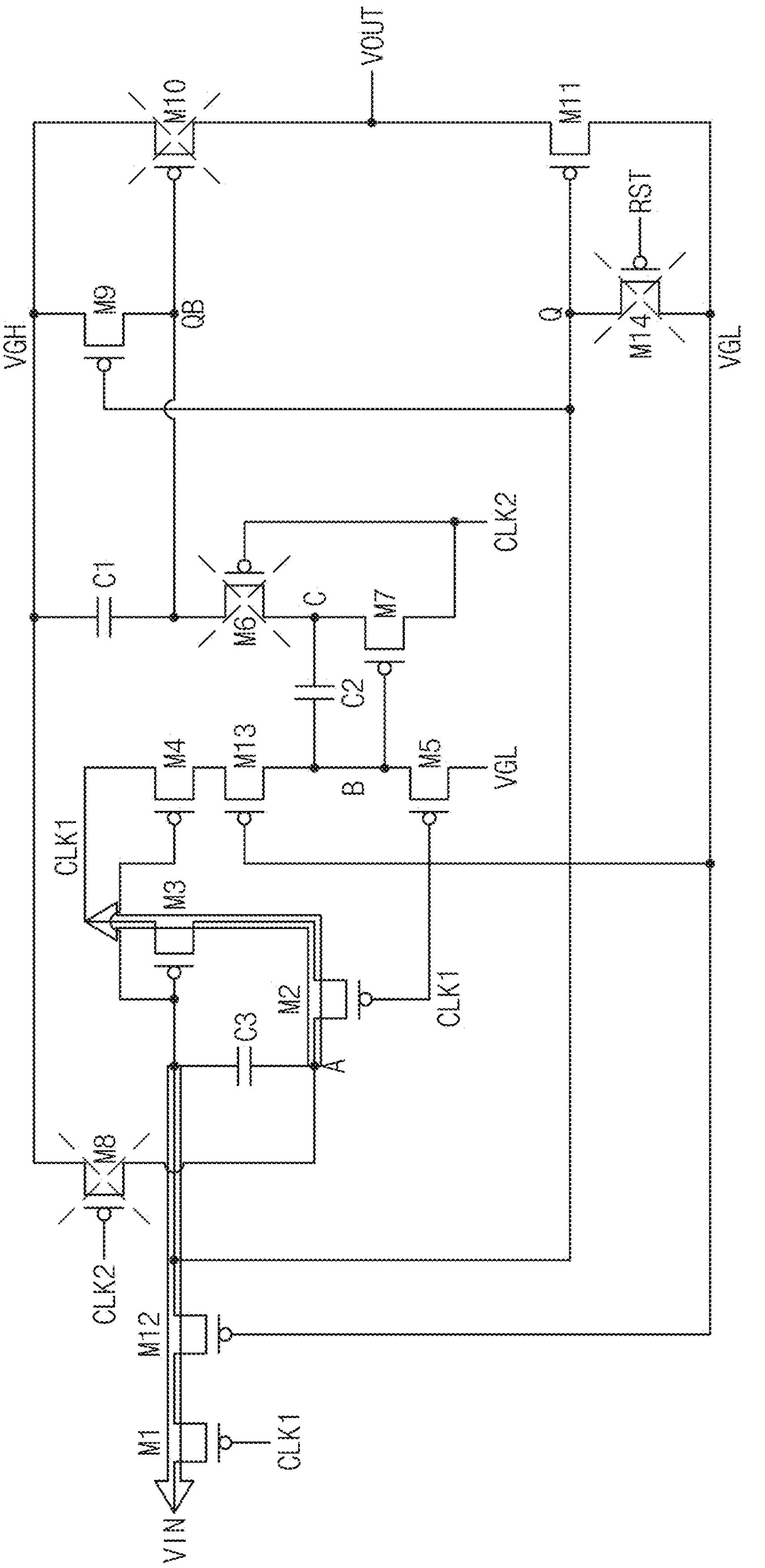
FIG. 14 is a circuit diagram illustrating further details of the gate driver of FIG. 2 in a sixth driving period.
Figure 15:
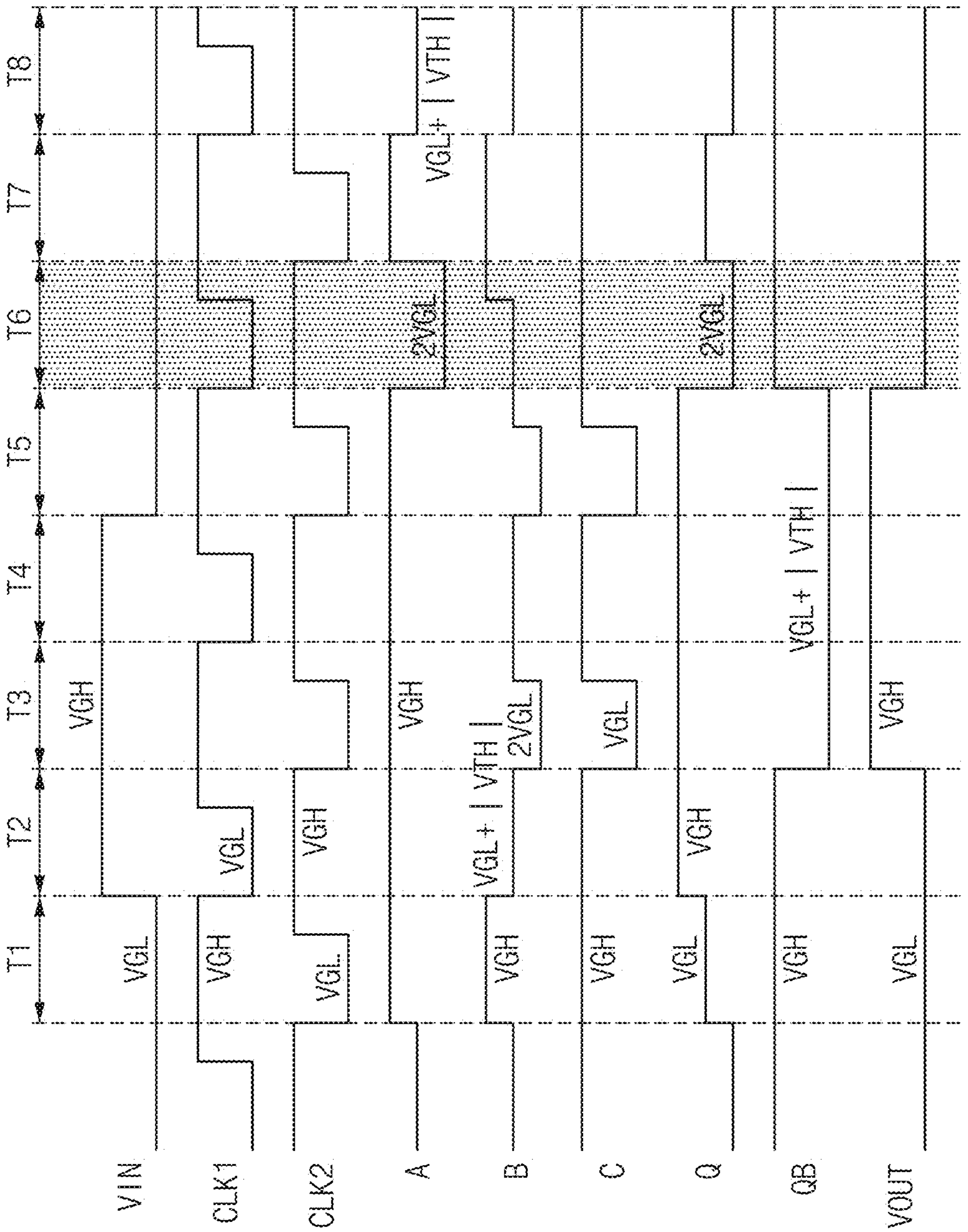
FIG. 15 is a timing diagram illustrating the input signals, the node signals and the output signals of the gate driver of FIG. 2 in the sixth driving period.
Figure 16:
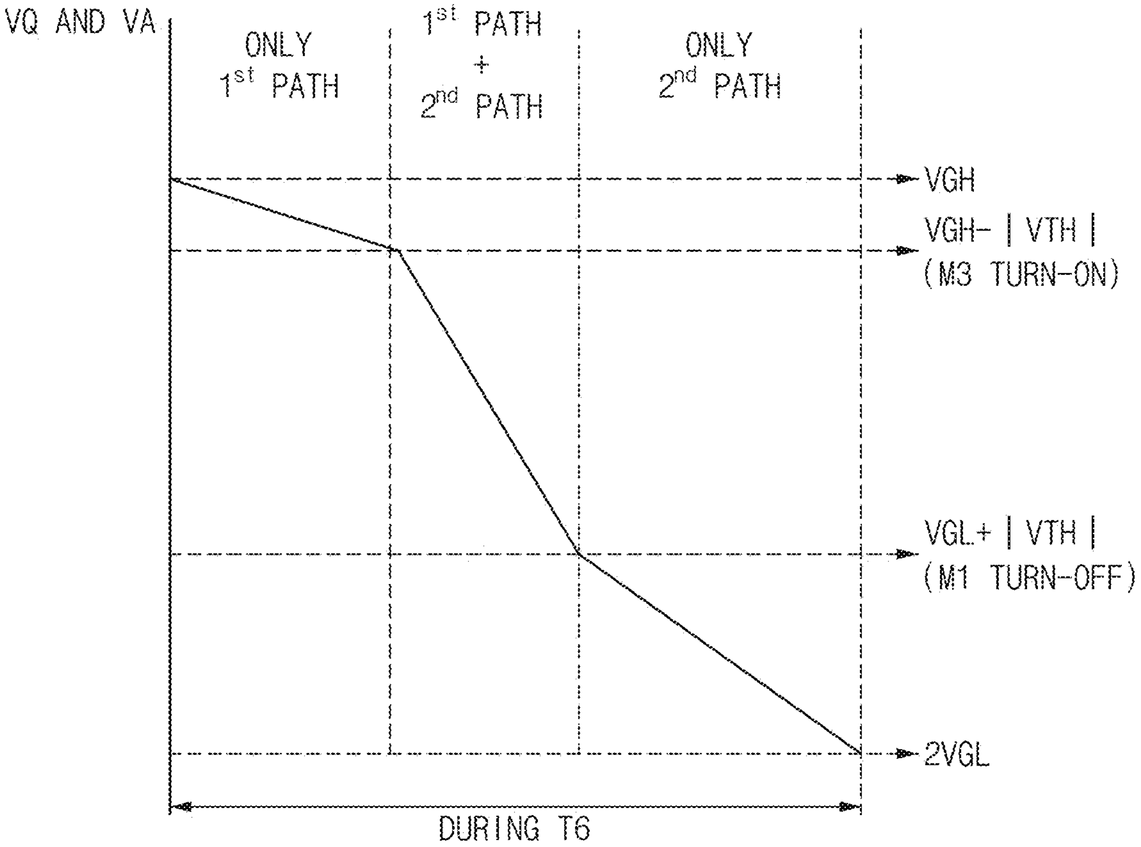
FIG. 16 is a waveform diagram illustrating a change of a signal of a Q-node and a change of a signal of an A-node of the gate driver of FIG. 2 in the sixth driving period.

FIG. 14 is a circuit diagram illustrating the gate driver 300 of FIG. 2 in a sixth driving period T6. FIG. 15 is a timing diagram illustrating the input signals, the node signals and the output signals of the gate driver 300 of FIG. 2 in the sixth driving period T6. FIG. 16 is a waveform diagram illustrating a change of the signal VQ of the Q-node and a change of the signal VA of the A-node of the gate driver 300 of FIG. 2 in the sixth driving period T6.

Referring to FIGS. 14 to 16, for example, the input signal VIN may have the low level in the sixth driving period T6 subsequent to the fifth driving period T5, the first clock signal CLK1 may have the low level in the sixth driving period T6, the second clock signal CLK2 may have the high level in the sixth driving period T6, the signal of the Q-node may have the second low level (e.g. 2VGL) in the sixth driving period T6, the signal of the QB-node may have the high level in the sixth driving period T6 and the gate output signal VOUT may have the low level in the sixth driving period T6.

In the sixth driving period T6, the first transistor M1, the second transistor M2 and the fifth transistor M5 may be turned on by the low level of the first clock signal CLK1.

In the sixth driving period T6, the low power voltage VGL may be applied to the B-node in response to the turned-on fifth transistor M5 so that the signal of the B-node may have the low level (e.g. VGL+|VTH|). In the sixth driving period T6, the seventh transistor M7 may be turned on by the low level of the signal of the B-node.

In the sixth driving period T6, the low level of the input signal VIN may be transmitted to the Q-node by the turned-on first transistor M1 and twelfth transistor M12. Thus, in the sixth driving period T6, the third transistor M3, the fourth transistor M4, the ninth transistor M9 and the eleventh transistor M11 which are connected to the Q-node may be turned on. For example, VGL may be applied to the control electrode and the first electrode of the first transistor M1 in an initial portion of the sixth driving period T6 so that VGL+|VTH| including a threshold voltage component of the first transistor M1 may be transmitted to the Q-node.

The second transistor M2 and the third transistor M3 may be turned on in the sixth driving period T6 so that the low level of the first clock signal CLK1 may be applied to the A-node. For example, VGL may be applied to the control electrode and the first electrode of the third transistor M3 in an initial portion of the sixth driving period T6 so that VGL+|VTH| including a threshold voltage component of the third transistor M3 may be transmitted to an intermediate node between the third transistor M3 and the second transistor M2. In addition, VGL may be applied to the control electrode of the second transistor M2 and the VGL+|VTH| may be applied to the second electrode of the second transistor M2 in an initial portion of the sixth driving period T6 so that VGL+2|VTH| including threshold voltage components of the second transistor M2 and the third transistor M3 may be transmitted to the A-node.

In the sixth driving period T6, the signal of the A-node may decrease from the high level (e.g. VGH) to the low level (e.g. VGL+2|VTH|) so that the change of the signal of the A-node may affect the signal of the Q-node by the third capacitor C3. Thus, the signal of the Q-node may be decreased to the second low level (e.g. 2VGL).

Similarly, in the sixth driving period T6, the signal of the Q-node may decrease from the high level (e.g. VGH) to the low level (e.g. VGL+2|VTH|) so that the change of the signal of the Q-node may affect the signal of the A-node by the third capacitor C3. Thus, the signal of the A-node may be decreased to the second low level (e.g. 2VGL).

In other words, in the sixth driving period T6 in which the input signal VINT has the low level and the first clock signal CLK1 has the low level, the signal of the Q-node may be decreased to the second low level (e.g. 2VGL) through a first path passing through the input circuit and a second path passing through the first A-node control circuit. The first path may pass through the twelfth transistor M12 and the first transistor M1 from the Q-node. The second path may pass through the second transistor M2 and the third transistor M3 from the A-node.

Herein, the first path may be referred to as 1st PATH and the second path may be referred to as 2nd PATH.

As shown in FIG. 16, only the first path 1st PATH may be activated in an initial portion of the sixth driving period T6 so that the signal VQ of the Q-node may be gradually decreased from VGH.

When the signal VQ of the Q-node becomes VGH−|VTH|, the third transistor M3 may be turned on. After the third transistor M3 is turned on, both of the first path 1st PATH and the second path 2nd PATH may be turned on, so that the signal VQ of the Q-node may be continuously decreased.

When the signal VQ of the Q-node becomes VGH+|VTH|, the first transistor M1 may be turned off. After the first transistor M1 is turned off, only the second path 2nd PATH may be activated so that the signal VQ of the Q-node may be continuously decreased to 2VGL.

Although, the signal VQ of the Q-node is explained above in detail, the signal VA of the A-node may also have value similar to the signal VQ of the Q-node by the third capacitor C3.

As explained above, in the sixth driving period T6, the signal of the Q-node may be lowered to the second low level 2VGL at once through the first path 1st PATH passing through the input circuit and the second path 2nd PATH passing through the first A-node control circuit without decreased to an intermediate voltage. Thus, an accuracy and a reliability of the gate driver 300 may be relatively enhanced and the display quality of the display panel 100 may be relatively enhanced.

When the seventh transistor M7 is turned on in the sixth driving period T6, the high level of the second clock signal CLK2 may be applied to the C-node so that the signal of the C-node may have the high level.

In the sixth driving period T6, the ninth transistor M9 connected to the QB-node may be turned on so that the high level may be applied to the QB-node and the signal of the QB-node may have the high level.

In the sixth driving period T6, the low power voltage VGL may be outputted as the gate output signal VOUT by the eleventh transistor M11 which is turned on by the signal of the Q-node.

In the sixth driving period T6, the sixth transistor M6, the eighth transistor M8, the tenth transistor M10 and the fourteenth transistor M14 may be turned off.

Figure 17:
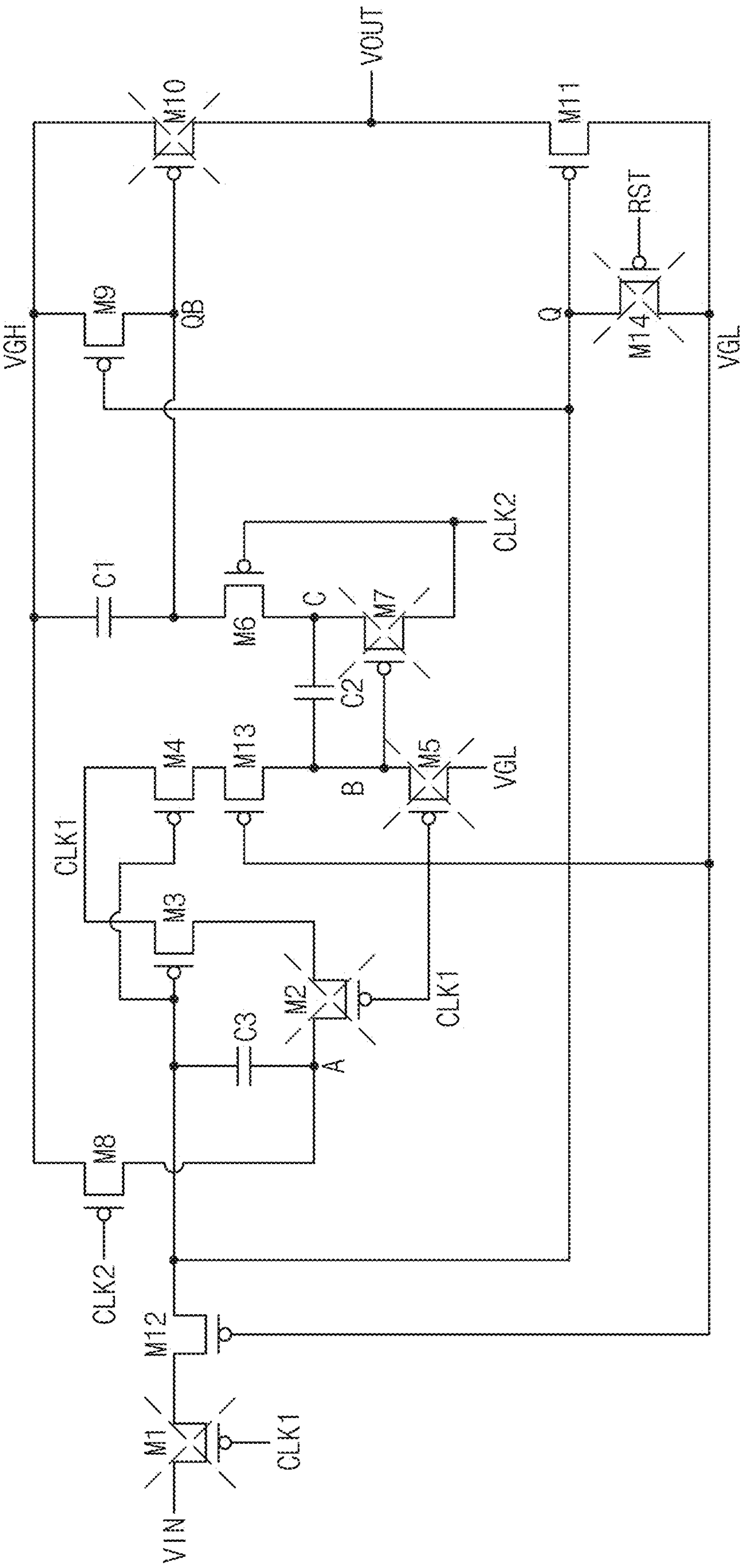
FIG. 17 is a circuit diagram illustrating further details of the gate driver of FIG. 2 in a seventh driving period.
Figure 18:
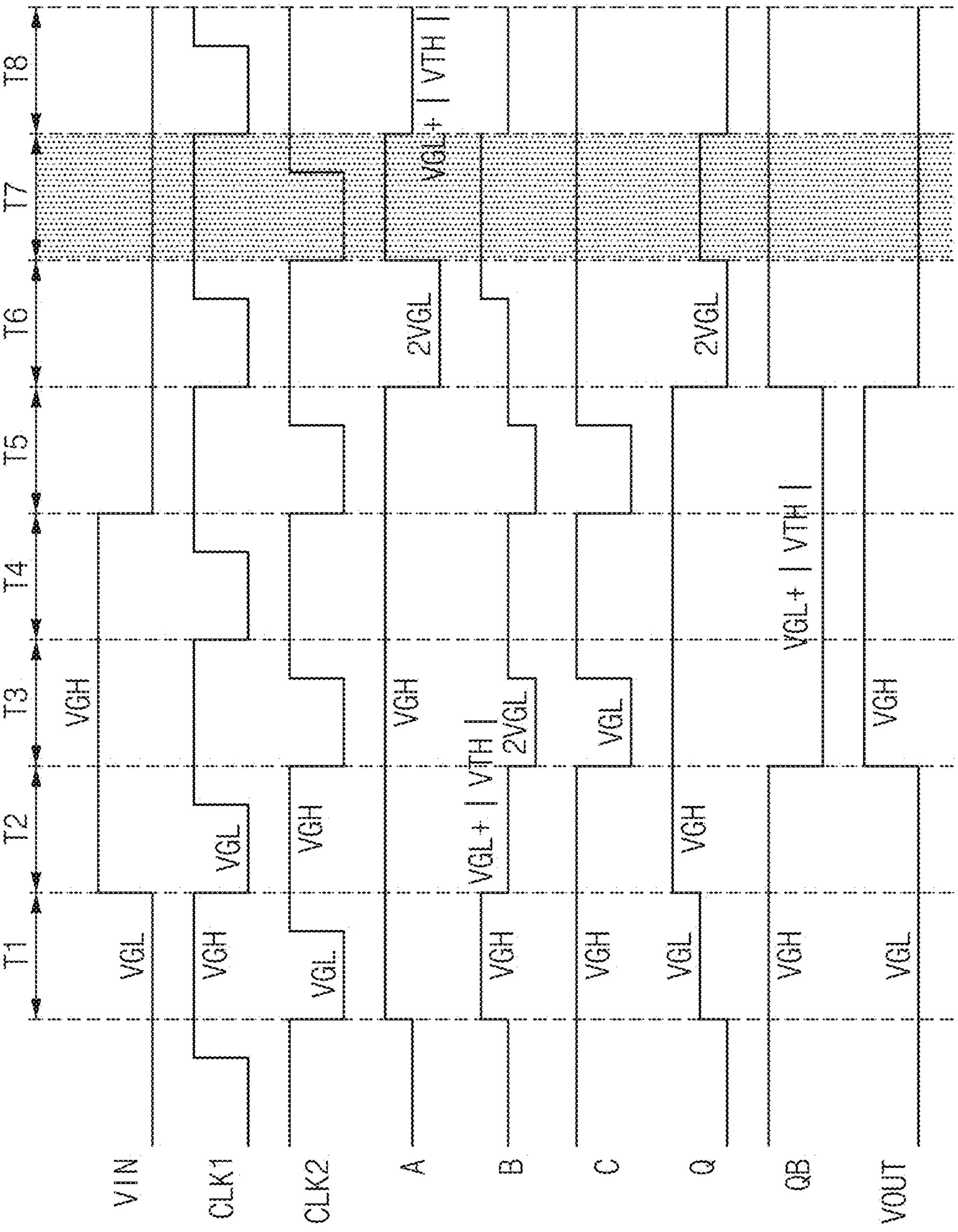
FIG. 18 is a timing diagram illustrating the input signals, the node signals and the output signals of the gate driver of FIG. 2 in the seventh driving period.

FIG. 17 is a circuit diagram illustrating the gate driver 300 of FIG. 2 in a seventh driving period T7. FIG. 18 is a timing diagram illustrating the input signals, the node signals and the output signals of the gate driver 300 of FIG. 2 in the seventh driving period T7.

Referring to FIGS. 17 and 18, for example, the input signal VIN may have the low level in the seventh driving period T7 subsequent to the sixth driving period T6, the first clock signal CLK1 may have the high level in the seventh driving period T7, the second clock signal CLK2 may have the low level in the seventh driving period T7, the signal of the Q-node may have the low level in the seventh driving period T7, the signal of the QB-node may have the high level in the seventh driving period T7 and the gate output signal VOUT may have the low level in the seventh driving period T7.

In the seventh driving period T7, the eighth transistor M8 may be turned on by the low level of the second clock signal CLK2 and the high power voltage VGH may be applied to the A-node by the eighth transistor M8 so that the signal of the A-node may have the high level.

When the signal of the A-node is changed from the low level (e.g. VGL+|VTH|) to the high level (e.g. VGH) in the seventh driving period T7, the signal of the Q-node may be changed from the second low level (e.g. 2VGL) to the low level (e.g. VGL) by the third capacitor C3.

In the seventh driving period T7, the signal of the Q-node has the low level (e.g. VGL) so that the third transistor M3, the fourth transistor M4, the ninth transistor M9 and the eleventh transistor M11 may be turned on by the signal of the Q-node.

In the seventh driving period T7, the high level (e.g. VGH) of the first clock signal CLK1 may be applied to the B-node by the fourth transistor M4 and the thirteenth transistor M13 so that the signal of the B-node may have the high level.

In the seventh driving period T7, the high power voltage VGH is applied to the QB-node by the ninth transistor M9 so that the signal of the QB-node may have the high level.

In the seventh driving period T7, the sixth transistor M6 may be turned on by the low level of the second clock signal CLK2 and the signal of the QB-node (e.g. VGH) may be applied to the C-node by the sixth transistor M6 so that the signal of the C-node may have the high level.

In the seventh driving period T7, the low power voltage VGL may be outputted as the gate output signal VOUT by the eleventh transistor M11 which is turned on by the signal of the Q-node.

In the seventh driving period T7, the first transistor M1, the second transistor M2, the fifth transistor M5, the seventh transistor M7, the tenth transistor M10 and the fourteenth transistor M14 may be turned off.

Figure 19:
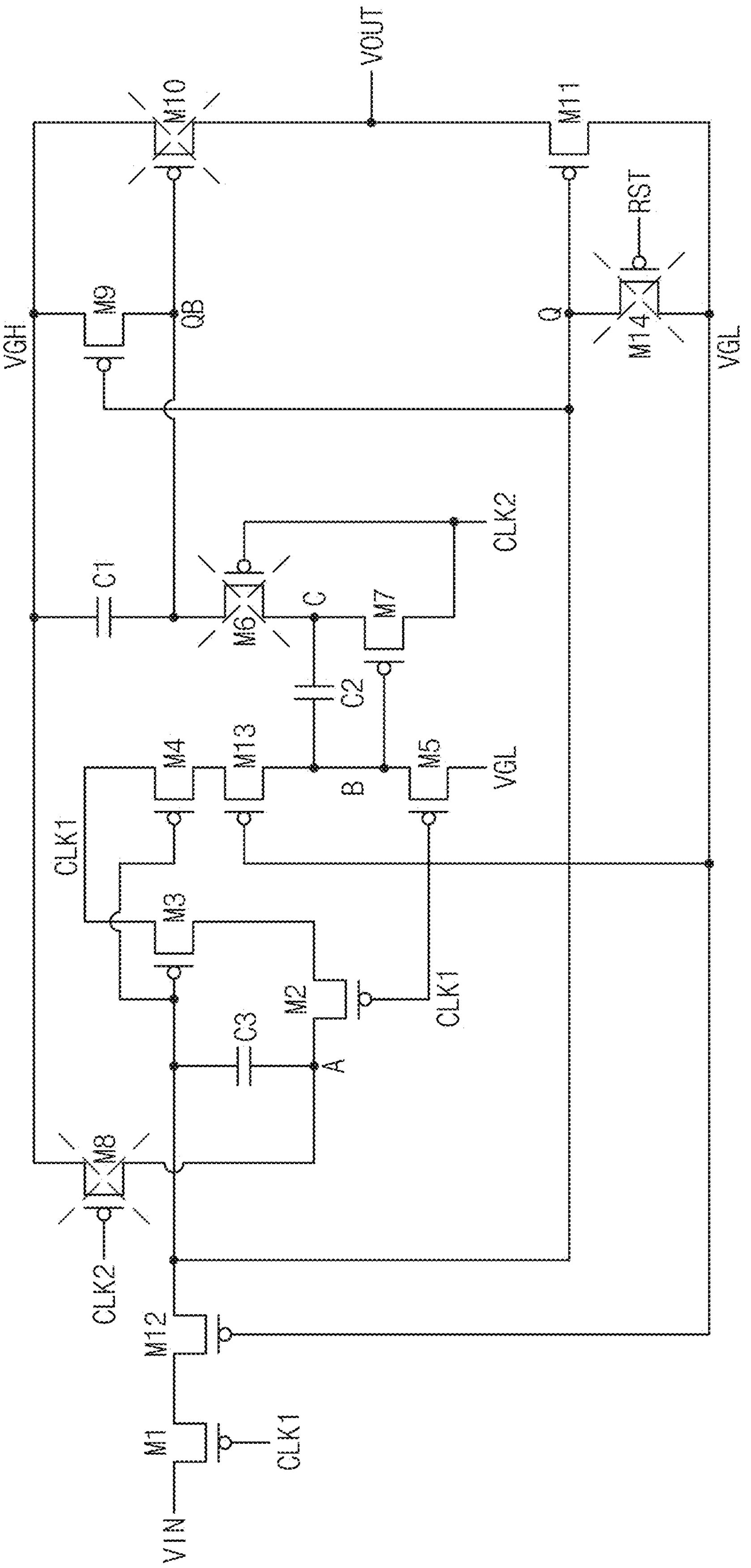
FIG. 19 is a circuit diagram illustrating further details of the gate driver of FIG. 2 in an eighth driving period.
Figure 20:
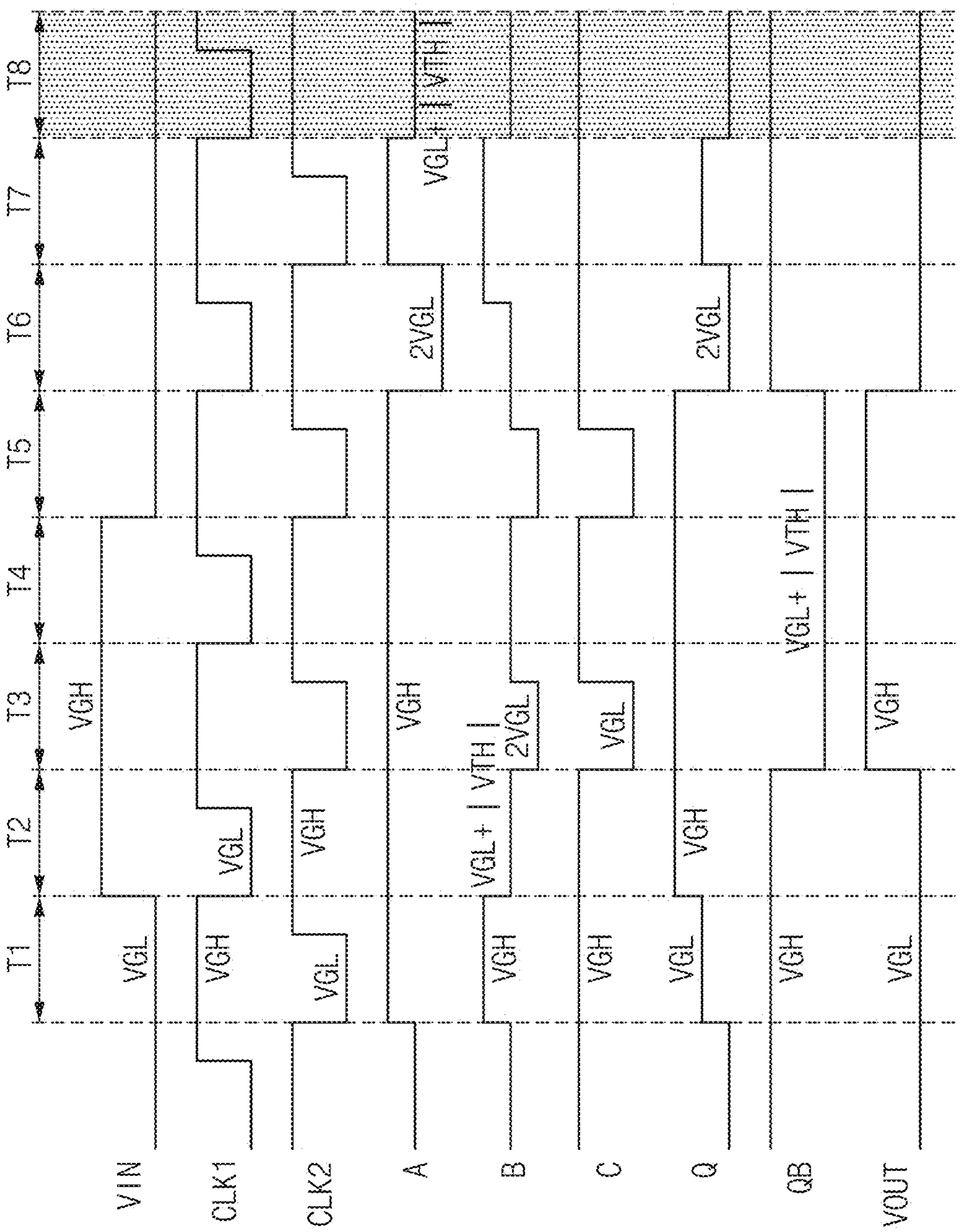
FIG. 20 is a timing diagram illustrating the input signals, the node signals and the output signals of the gate driver of FIG. 2 in the eighth driving period.

FIG. 19 is a circuit diagram illustrating the gate driver 300 of FIG. 2 in an eighth driving period T8. FIG. 20 is a timing diagram illustrating the input signals, the node signals and the output signals of the gate driver 300 of FIG. 2 in the eighth driving period T8.

Referring to FIGS. 19 and 20, for example, the input signal VIN may have the low level in the eighth driving period T8 subsequent to the seventh driving period T7, the first clock signal CLK1 may have the low level in the eighth driving period T8, the second clock signal CLK2 may have the high level in the eighth driving period T8, the signal of the Q-node may have the second low level (e.g. 2VGL) in the eighth driving period T8, the signal of the QB-node may have the high level in the eighth driving period T8 and the gate output signal VOUT may have the low level in the eighth driving period T8.

In the eighth driving period T8, the first transistor M1, the second transistor M2 and the fifth transistor M5 may be turned on by the low level of the first clock signal CLK1.

In the eighth driving period T8, the low power voltage VGL may be applied to the B-node in response to the turned-on fifth transistor M5 so that the signal of the B-node may have the low level (e.g. VGL+|VTH|). In the eighth driving period T8, the seventh transistor M7 may be turned on by the low level of the signal of the B-node.

In the eighth driving period T8, the low level of the input signal VIN may be transmitted to the Q-node by the turned-on first transistor M1 and twelfth transistor M12. Thus, in the eighth driving period T8, the third transistor M3, the fourth transistor M4, the ninth transistor M9 and the eleventh transistor M11 which are connected to the Q-node may be turned on.

The second transistor M2 and the third transistor M3 may be turned on in the eighth driving period T8 so that the low level of the first clock signal CLK1 may be applied to the A-node.

In the eighth driving period T8, the signal of the A-node may decrease from the high level (e.g. VGH) to the low level (e.g. VGL+|VTH|) so that the change of the signal of the A-node may affect the signal of the Q-node by the third capacitor C3. Thus, the signal of the Q-node may be decreased to the second low level (e.g. 2VGL).

The signal of the Q-node has the low level in the previous driving period T7 so that the signal of the A-node may not be decreased to the second low level (e.g. 2VGL) by the third capacitor C3 in the eighth driving period T8.

When the seventh transistor M7 is turned on in the eighth driving period T8, the high level of the second clock signal CLK2 may be applied to the C-node so that the signal of the C-node may have the high level.

In the eighth driving period T8, the ninth transistor M9 connected to the QB-node may be turned on so that the high level may be applied to the QB-node and the signal of the QB-node may have the high level.

In the eighth driving period T8, the low power voltage VGL may be outputted as the gate output signal VOUT by the eleventh transistor M11 which is turned on by the signal of the Q-node.

In the eighth driving period T8, the sixth transistor M6, the eighth transistor M8, the tenth transistor M10 and the fourteenth transistor M14 may be turned off.

According to some embodiments, when the input signal VIN has the low level and the first clock signal CLK1 has the low level, the signal of the Q-node may be lowered to the second low level 2VGL at once through the first path $1^{st}$ PATH passing through the input circuit (e.g. M12 and M1) and the second path $2^{nd}$ PATH passing through the first A-node control circuit (e.g. M2 and M3) without decreased to an intermediate voltage. Thus, an accuracy and a reliability of the gate driver 300 may be relatively enhanced and the display quality of the display panel 100 may be relatively enhanced.

In addition, the signal of the Q-node may be periodically refreshed (e.g. in the eighth driving period T8) to the second low level 2VGL using the second transistor M2 periodically operating in synchronization with the first clock signal CLK1 so that the current leakage of the Q-node may be prevented or reduced, and thus the reliability of the gate driver 300 may be relatively enhanced and the display quality of the display panel 100 may be relatively enhanced.

In addition, the current leakage of the Q-node may be prevented or reduced by refreshing the signal of the Q-node to the second low level 2VGL so that the gate driver 300 may support the low refresh rate driving. Thus, the power consumption of the display apparatus may be relatively reduced by the low refresh rate driving.

In addition, the gate driver 300 may be driven using only two power voltages including the high power voltage VGH and the low power voltage VGL so that a complexity of a power voltage generator may be relatively reduced and a complexity of a layout due to additional power lines may be relatively reduced.

Figure 21:
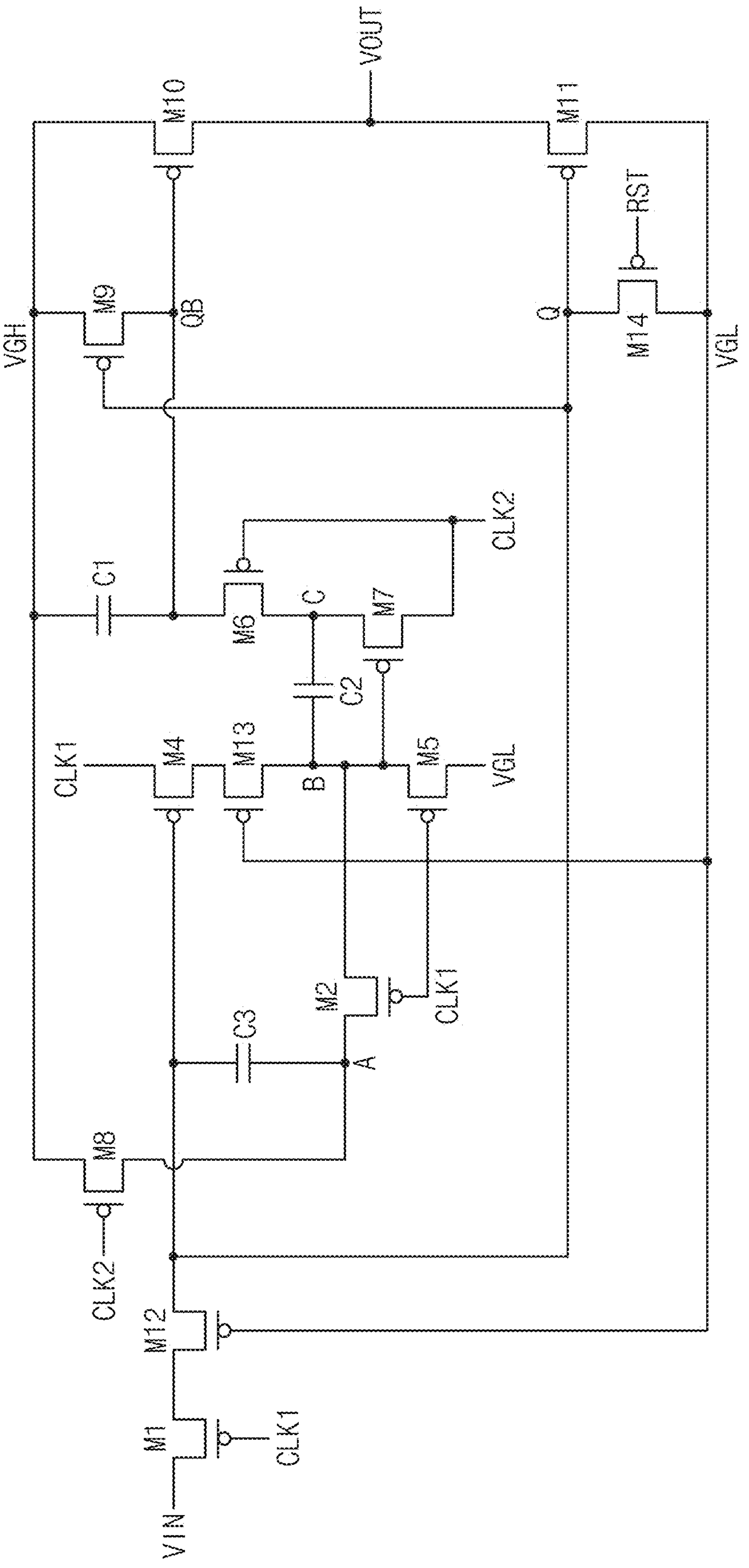
FIG. 21 is a circuit diagram illustrating aspects of a gate driver of a display apparatus according to some embodiments of the present disclosure.

FIG. 21 is a circuit diagram illustrating a gate driver 300 of a display apparatus according to some embodiments of the present disclosure. Although FIG. 21 illustrates various components in a gate driver according to some embodiments, according to some embodiments the gate driver may include additional components, or fewer components, without departing from the spirit and scope of embodiments according to the present disclosure.

Figure 22:
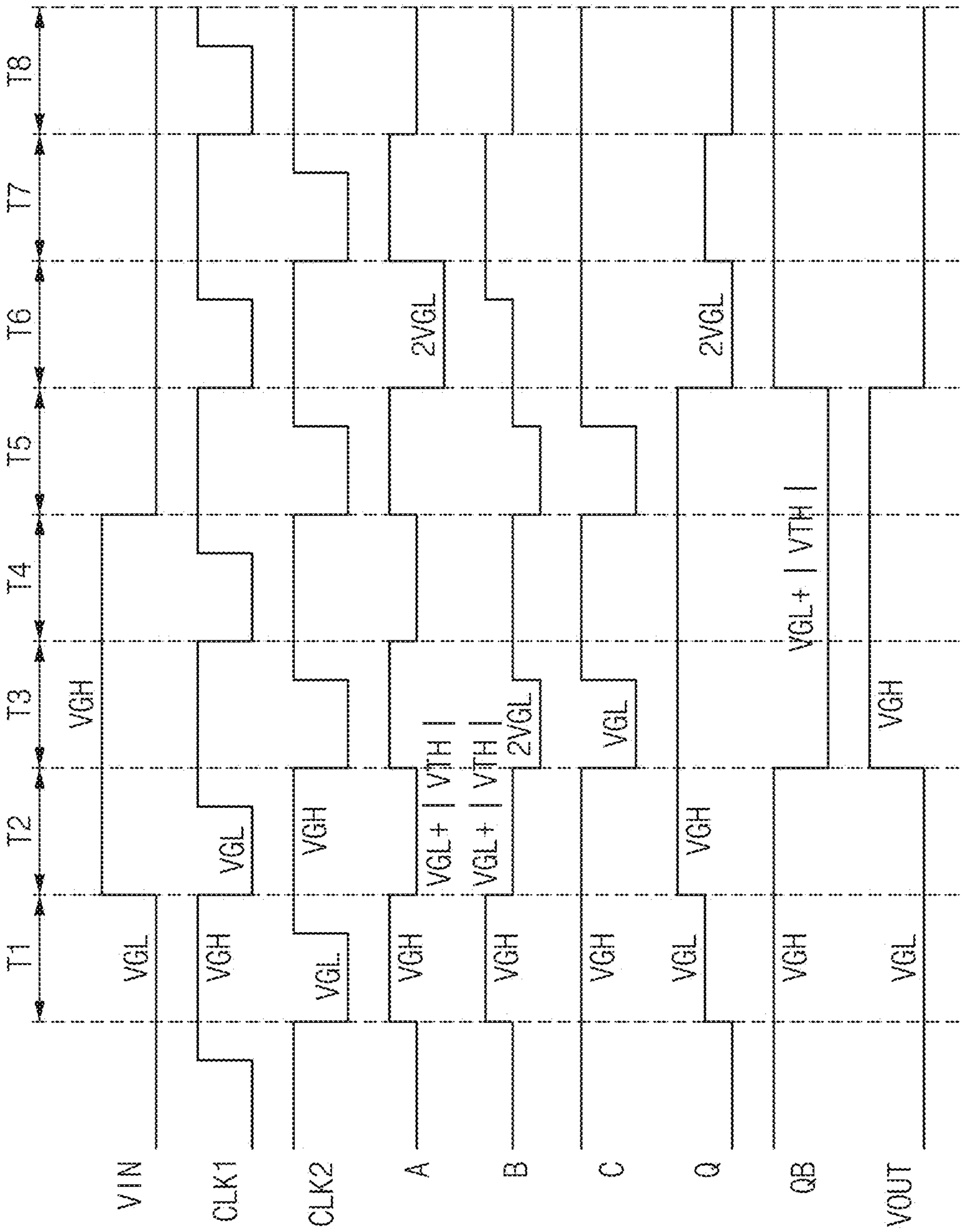
FIG. 22 is a timing diagram illustrating input signals, node signals and output signals of the gate driver of FIG. 21.

FIG. 22 is a timing diagram illustrating input signals, node signals and output signals of the gate driver 300 of FIG. 21.

The gate driver 300 according to the present embodiments is the same (or substantially the same) as the gate driver 300 of the previous embodiments illustrated in FIGS. 1 to 20 except for the structure of the first A-node control circuit and the waveform of the A-node. Thus, the same reference numerals will be used to refer to the same or like parts as those described in the previous embodiments of FIGS. 1 to 20 and some repetitive explanation concerning the above elements may be omitted.

Referring to FIGS. 1, 21 and 22, the gate driver 300 includes an input circuit transmitting an input signal VIN to a Q-node in response to the first clock signal CLK1, a first A-node control circuit controlling a signal of an A-node in response to the first clock signal CLK1 or a signal of the Q-node, a second A-node control circuit controlling a signal of the A-node in response to the second clock signal CLK2, a B-node control circuit controlling a signal of a B-node in response to the signal of the Q-node, a C-node control circuit controlling a signal of a C-node in response to the signal of the B-node, a first QB-node control circuit controlling a signal of a QB-node in response to the second clock signal CLK2, a second QB-node control circuit controlling the signal of the QB-node in response to the signal of the Q-node, a pull-up circuit pulling up a gate output signal VOUT to the high power voltage VGH in response to the signal of the QB-node and a pull-down circuit pulling down the gate output signal VOUT to the low power voltage VGL.

For example, the first A-node control circuit may include a second transistor M2 including a control electrode receiving the first clock signal CLK1, a first electrode connected to the A-node and a second electrode connected to the B-node.

The Q-node and the B-node are not related with each other in the previous embodiments so that a capacitance of the third capacitor C3 for bootstrapping the Q-node may be designed to be relatively small. In contrast, the Q-node and the B-node are related with each other in the present embodiments so that a capacitance of the third capacitor C3 for bootstrapping the Q-node may be designed to be relatively great. For example, the capacitance of the third capacitor C3 may be greater than a capacitance of the second capacitor C2.

Referring to FIG. 22, for example, the input signal VIN may have a low level (e.g. VGL) in a first driving period T1, the first clock signal CLK1 may have a high level (e.g. VGH) in the first driving period T1, the second clock signal CLK2 may have a low level (e.g. VGL) in the first driving period T1, the signal of the Q-node may have a low level (e.g. VGL) in the first driving period T1, the signal of the QB-node may have a high level (e.g. VGH) in the first driving period T1 and the gate output signal VOUT may have a low level (e.g. VGL) in the first driving period T1.

For example, the input signal VIN may have a high level (e.g. VGH) in a second driving period T2 subsequent to the first driving period T1, the first clock signal CLK1 may have a low level (e.g. VGL) in the second driving period T2, the second clock signal CLK2 may have a high level (e.g. VGH) in the second driving period T2, the signal of the Q-node may have a high level (e.g. VGH) in the second driving period T2, the signal of the QB-node may have the high level (e.g. VGH) in the second driving period T2 and the gate output signal VOUT may have the low level (e.g. VGL) in the second driving period T2.

For example, the input signal VIN may have the high level in a third driving period T3 subsequent to the second driving period T2, the first clock signal CLK1 may have the high level in the third driving period T3, the second clock signal CLK2 may have the low level in the third driving period T3, the signal of the Q-node may have the high level in the third driving period T3, the signal of the QB-node may have a low level (e.g. VGL+|VTH|) in the third driving period T3 and the gate output signal VOUT may have a high level (e.g. VGH) in the third driving period T3.

For example, the input signal VIN may have the high level in a fourth driving period T4 subsequent to the third driving period T3, the first clock signal CLK1 may have the low level in the fourth driving period T4, the second clock signal CLK2 may have the high level in the fourth driving period T4, the signal of the Q-node may have the high level in the fourth driving period T4, the signal of the QB-node may have the low level in the fourth driving period T4 and the gate output signal VOUT may have the high level in the fourth driving period T4.

For example, the input signal VIN may have the low level in the fifth driving period T5 subsequent to the fourth driving period T4, the first clock signal CLK1 may have the high level in the fifth driving period T5, the second clock signal CLK2 may have the low level in the fifth driving period T5, the signal of the Q-node may have the high level in the fifth driving period T5, the signal of the QB-node may have the low level in the fifth driving period T5 and the gate output signal VOUT may have the high level in the fifth driving period T5.

For example, the input signal VIN may have the low level in the sixth driving period T6 subsequent to the fifth driving period T5, the first clock signal CLK1 may have the low level in the sixth driving period T6, the second clock signal CLK2 may have the high level in the sixth driving period T6, the signal of the Q-node may have the second low level (e.g. 2VGL) in the sixth driving period T6, the signal of the QB-node may have the high level in the sixth driving period T6 and the gate output signal VOUT may have the low level in the sixth driving period T6.

According to some embodiments, the signal of the A-node may have a high level (e.g. VGH) in the second driving period T2 and the fourth driving period T4.

According to some embodiments, the A-node and the B-node are connected to each other by the second transistor M2 turned on in response to the first clock signal CLK1 so that a signal of the A-node may have a low level (e.g. VGL+|VTH|) in the second driving period T2 and the fourth driving period T4 like a signal of the B-node.

According to some embodiments, when the input signal VIN has the low level and the first clock signal CLK1 has the low level, the signal of the Q-node may be lowered to the second low level 2VGL at once through the first path $1^{st}$ PATH passing through the input circuit (e.g. M12 and M1) and the second path $2^{nd}$ PATH passing through the first A-node control circuit (e.g. M2) without decreased to an intermediate voltage. Thus, a reliability of the gate driver 300 may be relatively enhanced and the display quality of the display panel 100 may be relatively enhanced.

In addition, the signal of the Q-node may be periodically refreshed (e.g. in the eighth driving period T8) to the second low level 2VGL using the second transistor M2 periodically operating in synchronization with the first clock signal CLK1 so that the current leakage of the Q-node may be prevented or reduced, and thus the reliability of the gate driver 300 may be relatively enhanced and the display quality of the display panel 100 may be relatively enhanced.

In addition, the current leakage of the Q-node may be prevented by refreshing the signal of the Q-node to the second low level 2VGL so that the gate driver 300 may support the low refresh rate driving. Thus, the power consumption of the display apparatus may be relatively reduced by the low refresh rate driving.

In addition, the gate driver 300 may be driven using only two power voltages including the high power voltage VGH and the low power voltage VGL so that a complexity of a power voltage generator may be relatively reduced and a complexity of a layout due to additional power lines may be relatively reduced.

Figure 23:
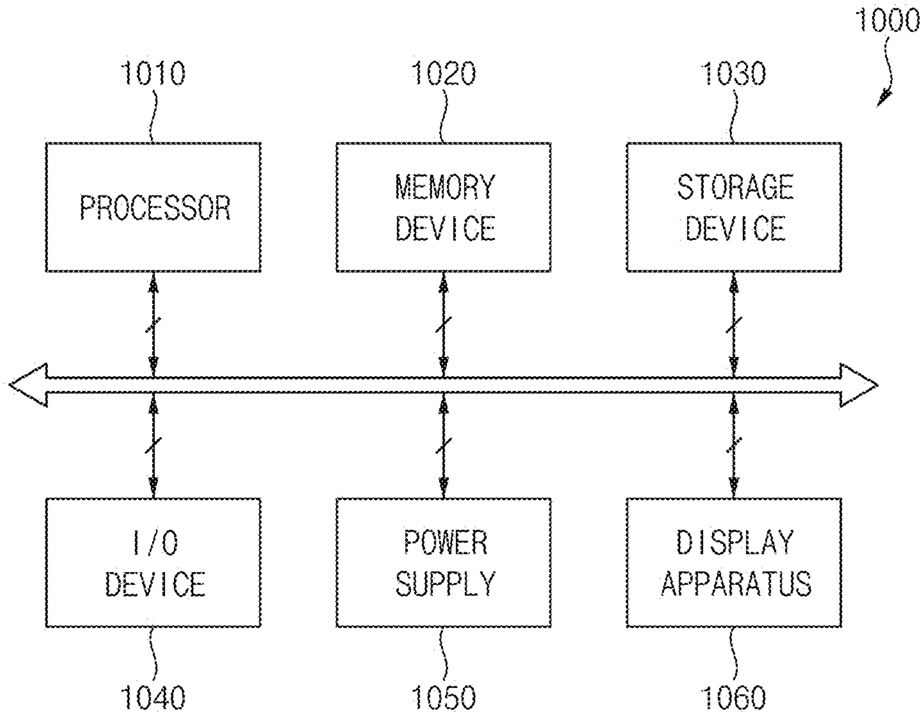
FIG. 23 is a block diagram illustrating aspects of an electronic apparatus according to some embodiments of the present disclosure.
Figure 24:
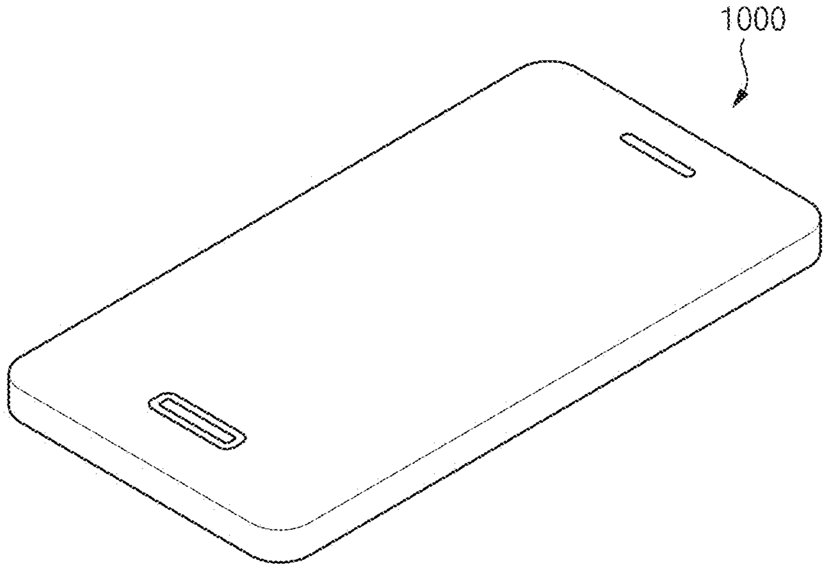
FIG. 24 is a diagram illustrating an example in which the electronic apparatus of FIG. 23 is implemented as a smart phone.
Figure 25:
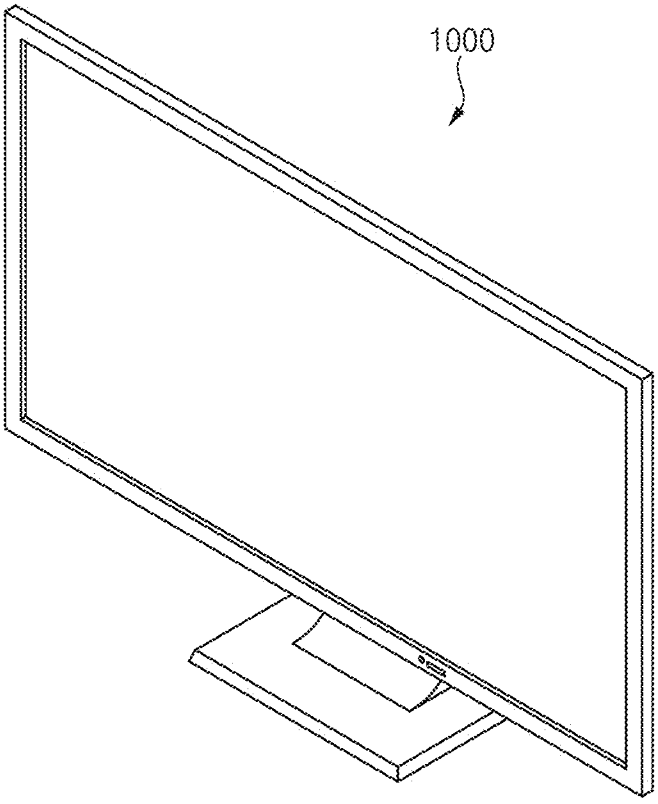
FIG. 25 is a diagram illustrating an example in which the electronic apparatus of FIG. 23 is implemented as a monitor.

FIG. 23 is a block diagram illustrating an electronic apparatus 1000 according to some embodiments of the present disclosure. FIG. 24 is a diagram illustrating an example in which the electronic apparatus 1000 of FIG. 23 is implemented as a smartphone. FIG. 25 is a diagram illustrating an example in which the electronic apparatus 1000 of FIG. 23 is implemented as a monitor.

Referring to FIGS. 23 to 25, the electronic apparatus 1000 may include a processor 1010, a memory device 1020, a storage device 1030, an input/output (I/O) device 1040, a power supply 1050, and a display apparatus 1060. Here, the display apparatus 1060 may be the display apparatus of FIG. 1. In addition, the electronic apparatus 1000 may further include a plurality of ports for communicating with a video card, a sound card, a memory card, a universal serial bus (USB) device, other electronic apparatuses, etc.

According to some embodiments, as illustrated in FIG. 24, the electronic apparatus 1000 may be implemented as a smartphone. According to some embodiments, as illustrated in FIG. 25, the electronic apparatus 1000 may be implemented as a monitor. However, the electronic apparatus 1000 is not limited thereto. For example, the electronic apparatus 1000 may be implemented as a television, a cellular phone, a video phone, a smart pad, a smart watch, a tablet PC, a car navigation system, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like and an output device such as a printer, a speaker, and the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

According to the gate driver, the display apparatus including the gate driver and the electronic apparatus including the display apparatus of the present disclosure as explained above, the reliability of the gate driver may be relatively enhanced, the display quality of the display panel may be relatively enhanced and the power consumption of the display apparatus may be relatively reduced.

The foregoing is illustrative of the present disclosure and is not to be construed as limiting thereof. Although a few embodiments of the present disclosure have been described, those skilled in the art will readily appreciate that many modifications are possible in the embodiments without materially departing from the novel teachings and characteristics of embodiments according to the present disclosure. Accordingly, all such modifications are intended to be included within the scope of the present disclosure as defined in the claims, and their equivalents. In the claims, means-plus-function clauses are intended to cover the structures described herein as performing the recited function and not only structural equivalents but also equivalent structures. Therefore, it is to be understood that the foregoing is illustrative of the present disclosure and is not to be construed as limited to the specific embodiments disclosed, and that modifications to the disclosed embodiments, as well as other embodiments, are intended to be included within the scope of the appended claims, and their equivalents. Embodiments according to the present disclosure are defined by the following claims, with equivalents of the claims to be included therein.

What is claimed is:

1. A gate driver comprising:

an input circuit configured to transmit an input signal to a Q-node in response to a first clock signal;

a first A-node control circuit configured to control a signal of an A-node in response to the first clock signal or a signal of the Q-node;

a second A-node control circuit configured to control the signal of the A-node in response to a second clock signal;

a B-node control circuit configured to control a signal of a B-node in response to the first clock signal and the signal of the Q-node;

a C-node control circuit configured to control a signal of a C-node in response to the signal of the B-node;

a first QB-node control circuit configured to control a signal of a QB-node in response to the second clock signal;

a second QB-node control circuit configured to control the signal of the QB-node in response to the signal of the Q-node;

a pull-up circuit configured to pull up a gate output signal to a high power voltage in response to the signal of the QB-node; and a pull-down circuit configured to pull down the gate output signal to a low power voltage in response to the signal of the Q-node.

2. The gate driver of claim 1, wherein based on the input signal having a low level and the first clock signal having a low level, the signal of the Q-node is decreased to a second low level through a first path passing through the input circuit and a second path passing through the first A-node control circuit.

3. The gate driver of claim 1, further comprising a first capacitor including a first electrode configured to receive the high power voltage and a second electrode connected to the QB-node.

4. The gate driver of claim 1, further comprising a second capacitor including a first electrode connected to the B-node and a second electrode connected to the C-node.

5. The gate driver of claim 1, further comprising a third capacitor including a first electrode connected to the Q-node and a second electrode connected to the A-node.

6. The gate driver of claim 1, wherein the input circuit comprises:

a first transistor including a control electrode configured to receive the first clock signal, a first electrode configured to receive the input signal and a second electrode connected to a first intermediate node; and a twelfth transistor including a control electrode configured to receive the low power voltage, a first electrode connected to the first intermediate node and a second electrode connected to the Q-node.

7. The gate driver of claim 1, wherein the first A-node control circuit comprises:

a second transistor including a control electrode configured to receive the first clock signal, a first electrode connected to the A-node and a second electrode connected to a second intermediate node; and a third transistor including a control electrode connected to the Q-node, a first electrode configured to receive the first clock signal and a second electrode connected to the second intermediate node.

8. The gate driver of claim 1, wherein the first A-node control circuit comprises:

a second transistor including a control electrode configured to receive the first clock signal, a first electrode connected to the A-node and a second electrode connected to the B-node.

9. The gate driver of claim 1, wherein the second A-node control circuit comprises:

an eighth transistor including a control electrode configured to receive the second clock signal, a first electrode configured to receive the high power voltage and a second electrode connected to the A-node.

10. The gate driver of claim 1, wherein the B-node control circuit comprises:

a fourth transistor including a control electrode connected to the Q-node, a first electrode configured to receive the first clock signal and a second electrode connected to a third intermediate node;

a thirteenth transistor including a control electrode configured to receive the low power voltage, a first electrode connected to the third intermediate node and a second electrode connected to the B-node; and a fifth transistor including a control electrode configured to receive the first clock signal, a first electrode configured to receive the low power voltage and a second electrode connected to the B-node.

11. The gate driver of claim 1, wherein the C-node control circuit comprises:

a seventh transistor including a control electrode connected to the B-node, a first electrode configured to receive the second clock signal and a second electrode connected to the C-node.

12. The gate driver of claim 1, wherein the first QB-node control circuit comprises:

a sixth transistor including a control electrode configured to receive the second clock signal, a first electrode connected to the QB-node and a second electrode connected to the C-node.

13. The gate driver of claim 1, wherein the second QB-node control circuit comprises:

a ninth transistor including a control electrode connected to the Q-node, a first electrode configured to receive the high power voltage and a second electrode connected to the QB-node.

14. The gate driver of claim 1, wherein the input signal has a low level in a first driving period, wherein the first clock signal has a high level in the first driving period, wherein the second clock signal has a low level in the first driving period, wherein the signal of the Q-node has a low level in the first driving period, wherein the signal of the QB-node has a high level in the first driving period, and wherein the gate output signal has a low level in the first driving period.

15. The gate driver of claim 14, wherein the input signal has a high level in a second driving period subsequent to the first driving period, wherein the first clock signal has a low level in the second driving period, wherein the second clock signal has a high level in the second driving period, wherein the signal of the Q-node has a high level in the second driving period, wherein the signal of the QB-node has the high level in the second driving period, and wherein the gate output signal has the low level in the second driving period.

16. The gate driver of claim 15, wherein the input signal has the high level in a third driving period subsequent to the second driving period, wherein the first clock signal has the high level in the third driving period, wherein the second clock signal has the low level in the third driving period, wherein the signal of the Q-node has the high level in the third driving period, wherein the signal of the QB-node has a low level in the third driving period, and wherein the gate output signal has a high level in the third driving period.

17. The gate driver of claim 16, wherein the input signal has the high level in a fourth driving period subsequent to the third driving period, wherein the first clock signal has the low level in the fourth driving period, wherein the second clock signal has the high level in the fourth driving period, wherein the signal of the Q-node has the high level in the fourth driving period, wherein the signal of the QB-node has the low level in the fourth driving period, and wherein the gate output signal has the high level in the fourth driving period.

18. The gate driver of claim 17, wherein the input signal has the low level in a fifth driving period subsequent to the fourth driving period, wherein the first clock signal has the high level in the fifth driving period, wherein the second clock signal has the low level in the fifth driving period, wherein the signal of the Q-node has the high level in the fifth driving period, wherein the signal of the QB-node has the low level in the fifth driving period, wherein the gate output signal has the high level in the fifth driving period, wherein the input signal has the low level in a sixth driving period subsequent to the fifth driving period, wherein the first clock signal has the low level in the sixth driving period, wherein the second clock signal has the high level in the sixth driving period, wherein the signal of the Q-node has a second low level in the sixth driving period, wherein the signal of the QB-node has the high level in the sixth driving period, and wherein the gate output signal has the low level in the sixth driving period.

19. A display apparatus comprising:

a display panel including a pixel;

a gate driver configured to output a gate signal to the pixel; and a data driver configured to output a data voltage to the pixel, wherein the gate driver comprises:

an input circuit configured to transmit an input signal to a Q-node in response to a first clock signal;

a first A-node control circuit configured to control a signal of an A-node in response to the first clock signal or a signal of the Q-node;

a second A-node control circuit configured to control the signal of the A-node in response to a second clock signal;

a B-node control circuit configured to control a signal of a B-node in response to the first clock signal and the signal of the Q-node;

a C-node control circuit configured to control a signal of a C-node in response to the signal of the B-node;

a first QB-node control circuit configured to control a signal of a QB-node in response to the second clock signal;

a second QB-node control circuit configured to control the signal of the QB-node in response to the signal of the Q-node;

a pull-up circuit configured to pull up the gate signal to a high power voltage in response to the signal of the QB-node; and a pull-down circuit configured to pull down the gate signal to a low power voltage in response to the signal of the Q-node.

20. An electronic apparatus comprising:

a display panel including a pixel;

a gate driver configured to output a gate signal to the pixel;

a data driver configured to output a data voltage to the pixel;

a driving controller configured to control the gate driver and the data driver; and a processor configured to output input image data and an input control signal to the driving controller, wherein the gate driver comprises:

an input circuit configured to transmit an input signal to a Q-node in response to a first clock signal;

a first A-node control circuit configured to control a signal of an A-node in response to the first clock signal or a signal of the Q-node;

a second A-node control circuit configured to control the signal of the A-node in response to a second clock signal;

a B-node control circuit configured to control a signal of a B-node in response to the first clock signal and the signal of the Q-node;

a C-node control circuit configured to control a signal of a C-node in response to the signal of the B-node;

a first QB-node control circuit configured to control a signal of a QB-node in response to the second clock signal;

a second QB-node control circuit configured to control the signal of the QB-node in response to the signal of the Q-node;

a pull-up circuit configured to pull up the gate signal to a high power voltage in response to the signal of the QB-node; and a pull-down circuit configured to pull down the gate signal to a low power voltage in response to the signal of the Q-node.

* * * * *